(12) United States Patent
Pastrick et al.

(10) Patent No.: US 6,780,017 B2
(45) Date of Patent: Aug. 24, 2004

(54) CARDIOPULMONARY RESUSCITATION MANIKIN WITH REPLACEABLE LUNG BAG AND INSTALLATION TOOL

(75) Inventors: John J. Pastrick, University Heights, OH (US); Christopher M. Charlton, Wadsworth, OH (US)

(73) Assignee: Cardiac Science, Inc., Irvine, CA (US)

( * ) Notice: Subject to any disclaimer, the term of this patent is extended or adjusted under 35 U.S.C. 154(b) by 0 days.

(21) Appl. No.: 10/143,043

(22) Filed: May 9, 2002

(65) Prior Publication Data

US 2003/0022142 A1 Jan. 30, 2003

Related U.S. Application Data

(63) Continuation-in-part of application No. 09/157,715, filed on Sep. 21, 1998.
(60) Provisional application No. 60/289,753, filed on May 9, 2001.

(51) Int. Cl.[7] .............................................. G09B 23/28
(52) U.S. Cl. .................... 434/265; 434/267; 434/262
(58) Field of Search ................................ 434/265, 267, 434/262

(56) References Cited

U.S. PATENT DOCUMENTS

| | | |
|---|---|---|
| 2,947,470 A | 8/1960 | Ruben et al. |
| 2,966,929 A | 1/1961 | Brown |
| 3,049,811 A | 8/1962 | Ruben |
| 3,152,404 A * | 10/1964 | Cheshire et al. ............ 434/265 |
| 3,199,225 A | 8/1965 | Robertson et al. |
| 3,369,411 A | 2/1968 | Hines |
| 3,556,122 A | 1/1971 | Laerdal |
| 3,562,925 A | 2/1971 | Baermann et al. |
| 3,665,919 A | 5/1972 | Laerdal |
| 3,689,945 A | 9/1972 | Laerdal |
| 3,736,362 A | 5/1973 | Laerdal |
| 3,768,696 A | 10/1973 | Laerdal |
| 3,859,737 A | 1/1975 | Laerdal |
| 3,872,609 A | 3/1975 | Smrcka |
| 3,874,093 A | 4/1975 | Garbe |
| 3,916,535 A | 11/1975 | Hewson |
| 3,994,075 A | 11/1976 | Køhnke |
| 4,001,950 A | 1/1977 | Blumensaadt |
| 4,005,709 A | 2/1977 | Laerdal |
| 4,006,329 A | 2/1977 | Hellman et al. |
| 4,019,501 A | 4/1977 | Harris |
| 4,062,357 A | 12/1977 | Laerdal |
| 4,084,811 A | 4/1978 | Kyo |
| 4,092,788 A | 6/1978 | Gowing |
| 4,095,590 A | 6/1978 | Harrigan |
| 4,182,320 A | 1/1980 | Sweeney |
| 4,331,426 A | 5/1982 | Sweeney |
| 4,345,605 A | 8/1982 | Gereg |
| 4,360,345 A | 11/1982 | Hon |

(List continued on next page.)

FOREIGN PATENT DOCUMENTS

| | | | |
|---|---|---|---|
| EP | 0708428 A3 | 4/1977 | |
| EP | 306328 A1 * | 3/1989 | ........... G09B/23/28 |
| EP | 0396799 A1 | 5/1989 | |
| FR | 1.308.180 | 12/1961 | |

OTHER PUBLICATIONS

Nasco Life/form Basic Buddy CPR Manikin LF03693U Instruction Manual—1998.

*Primary Examiner*—Derris H. Banks
*Assistant Examiner*—Urszula M Cegielnik
(74) *Attorney, Agent, or Firm*—Calfee, Halter & Griswold LLP

(57) ABSTRACT

An adult/child and infant manikin for cardiopulmonary resuscitation including a head simulation having a neck opening and a mouth opening. A removable lung bag can easily be placed within the head simulation using a bag insertion tool without any dismantling of the head simulation.

14 Claims, 27 Drawing Sheets

U.S. PATENT DOCUMENTS

| | | |
|---|---|---|
| 4,402,327 A | 9/1983 | Lambert et al. |
| 4,484,896 A | 11/1984 | Kohnke |
| 4,490,810 A | 12/1984 | Hon |
| 4,510,931 A | 4/1985 | Henderson et al. |
| 4,588,383 A | 5/1986 | Parker et al. |
| 4,611,998 A | 9/1986 | Ramamurthy |
| 4,619,617 A | 10/1986 | Rice |
| 4,797,104 A | 1/1989 | Laerdal et al. |
| 4,797,105 A | 1/1989 | Green |
| 4,801,268 A | 1/1989 | Køhnke |
| 4,802,857 A | 2/1989 | Laughlin |
| 4,828,501 A | 5/1989 | Ingenito et al. |
| 4,850,876 A | 7/1989 | Lutaenko et al. |
| 4,852,675 A | 8/1989 | Wang |
| 4,863,385 A | 9/1989 | Pierce |
| 4,915,635 A | 4/1990 | Ingenito et al. |
| 4,932,879 A | 6/1990 | Ingenito et al. |
| 4,984,987 A | 1/1991 | Brault et al. |
| 5,055,052 A | 10/1991 | Johnsen |
| 5,083,559 A | 1/1992 | Brault et al. |
| 5,088,037 A | 2/1992 | Battaglia |
| 5,195,896 A | 3/1993 | Sweeney et al. |
| 5,238,409 A | 8/1993 | Brault et al. |
| 5,239,988 A | 8/1993 | Swanson et al. |
| 5,249,968 A | 10/1993 | Brault et al. |
| 5,256,070 A | 10/1993 | Garth et al. |
| 5,286,206 A | 2/1994 | Epstein et al. |
| 5,295,835 A | 3/1994 | Scheinberg et al. |
| 5,312,259 A | 5/1994 | Flynn |
| 5,330,514 A | 7/1994 | Egelandsdal et al. |
| 5,383,786 A | 1/1995 | Køhnke |
| 5,397,237 A | 3/1995 | Dhont et al. |
| 5,397,892 A | 3/1995 | Abdelqader |
| 5,423,685 A | 6/1995 | Adamson et al. |
| 5,468,151 A | 11/1995 | Egelandsdal et al. |
| 5,540,592 A | 7/1996 | Scheinberg et al. |
| 5,580,255 A | 12/1996 | Flynn |

* cited by examiner

CARDIOPULMONARY RESUSCITATION MANIKIN WITH REPLACEABLE LUNG BAG AND INSTALLATION TOOL

PRIORITY CLAIM

This application claims the benefit of U.S. patent application Ser. No. 09/157,715 filed on Sep. 21, 1998, and U.S. provisional patent application No. 60/289,753 filed on May 9, 2001 the entirety of which are hereby incorporated by reference.

FIELD OF THE INVENTION

This invention relates to improved manikins for teaching cardiopulmonary resuscitation including ventilation and external heart message.

BACKGROUND OF THE INVENTION

Manikins are often used as an instructional aid in teaching students cardiopulmonary resuscitation techniques. Training manikins are also used as a practice aid to simulate conditions under which rescue personnel may be required to treat injured persons. As both teaching or demonstration aids and practice aids, manikins enable the realistic application of proper emergency cardiopulmonary resuscitation ("CPR") techniques including ventilation and external heart massage. Also manikins can be utilized for teaching and practicing other rescue techniques such as the Heimlich maneuver.

The manikin should be designed so that it can aid in the teaching of pulmonary ventilation or "mouth-to-mouth resuscitation". Also, the manikin needs to be safe and hygienic so that multiple persons can learn rescue techniques on a single manikin. A replaceable "lung bag" is a preferred way to simulate pulmonary ventilation without requiring extensive sterilization of the manikin between users. However, because the lung bag must extend from the mouth opening through the head of the manikin and into the simulated chest cavity, installation of the lung bag may require extensive dismantling of the manikin or superior manual dexterity of the user. What is desired is a simple inexpensive way to remove and install lung bags.

SUMMARY OF THE INVENTION

The present invention provides a new and system and method for replacing lung bags within a training manikin. In one embodiment of the invention the new system includes an insertion tool having two ends, one of which can be inserted through the neck section, mouth opening and the passage therebetween of the manikin. The insertion tool also includes a point which can be attached to a device on the lung bag to assist in placing the lung bag within the manikin. The lung bag includes a pouch section, neck section and open end section.

In another embodiment of the invention a method of installing a lung bag using a installation tool is disclosed. The method includes the steps of: inserting the insertion tool into a first opening of said manikin, moving the insertion tool through the manikin until it protrudes from a second opening, attaching a lung bag to the insertion tool and retracting the insertion tool back through the manikin until the lung bag protrudes from the first opening as well as the second opening of said manikin, and finally detaching the insertion tool from the lung bag.

The improved lung bag and associated installation tool greatly simplify the bag installation process. Minimal dismantling of the manikin is required to provide access for the installation tool. Additionally, the amount of manual dexterity required to move the bag into place is greatly reduced by using the installation tool.

For a better understanding of the manikin, lung bag, and insertion tool of the present invention and its advantages, reference should be made to the following detailed description of the invention taken in conjunction with the accompanying drawings. Additionally, other features and advantages the present invention will become apparent from the following detailed description of the preferred embodiments made with reference to the accompanying drawings, which are incorporated in and form a part of the specification.

DETAILED DESCRIPTION OF THE PRESENT INVENTION

The present invention is a manikin apparatus 10, 10' for use as an instructional and practice aid in the teaching and simulating of cardiopulmonary resuscitation. The apparatus is in the form of a manikin resembling portions of a human body. The manikin has a torso simulation 12, 12' a neck attachment 14, 14' and a head simulation 16, 16'. The invention preferably provides both an adult/child embodiment as shown in FIGS. 1–14 and an infant embodiment as shown in FIGS. 15–23. It is noted that to the extent features of one embodiment of the apparatus are identical to features in an alternate embodiment of the apparatus, those features may not be discussed further, and are referenced in the figures with a prime designation.

As shown, both the adult/child embodiment in FIGS. 1–14 and the infant embodiment in FIGS. 15–23 have the torso simulation 12, 12' connected to the head simulation 16, 16' by the neck attachment 14, 14'.

Figure 5:
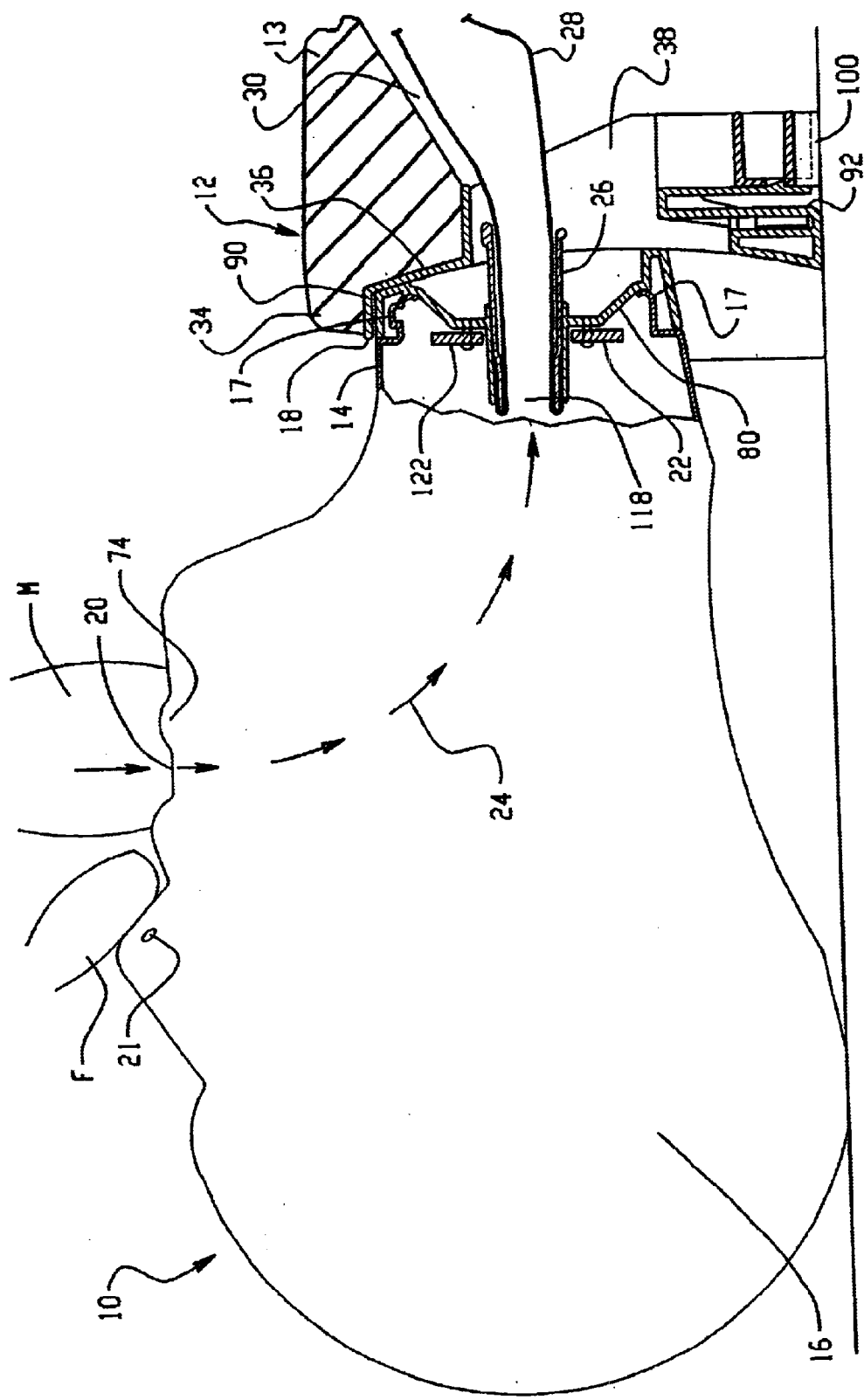
FIG. 5 is a schematic cut-away side view of the head simulation interconnected with the neck attachment, which is interconnected with a torso simulation, with the airway in the open position as shown in FIGS. 3 and 4.

The neck attachment 14, 14' is constructed to slide within a neck/torso interface 18, 18'. This movement mimics the movement of a human head and neck when a downward force is applied to the forehead. The head simulation 16, 16' has a mouth opening 20, 20' and neck opening 22, 22' that define an airway passage 24, 24', which is illustrated by arrows shown, for example, in FIGS. 5 and 17. In the preferred embodiment of FIGS. 5 and 13, the head simulation 16 additionally includes nostril openings 21. During the practice of mouth-to-mouth resuscitation using the adult/child manikin, the nostril openings 21 must be covered by the trainee's fingers F. This procedure is intended to simulate pinching of the nostrils in a human. Since, but for the nostril openings 21 and the mouth opening 20, the head simulation 16 is sealed, the covering of the nostril openings 21 results in airflow to the airway passage 24 from the mouth M of the trainee through the mouth opening 20, as shown in FIG. 5.

In the embodiments of the present apparatus, the head simulation 16, 16' is a rigid one-piece, blow molded plastic structure, preferably of polyethylene copolymer material. This material may be readily placed in dishwasher or subjected to other cleaning procedures. However, a variety of alternate materials may be used.

Figure 17:
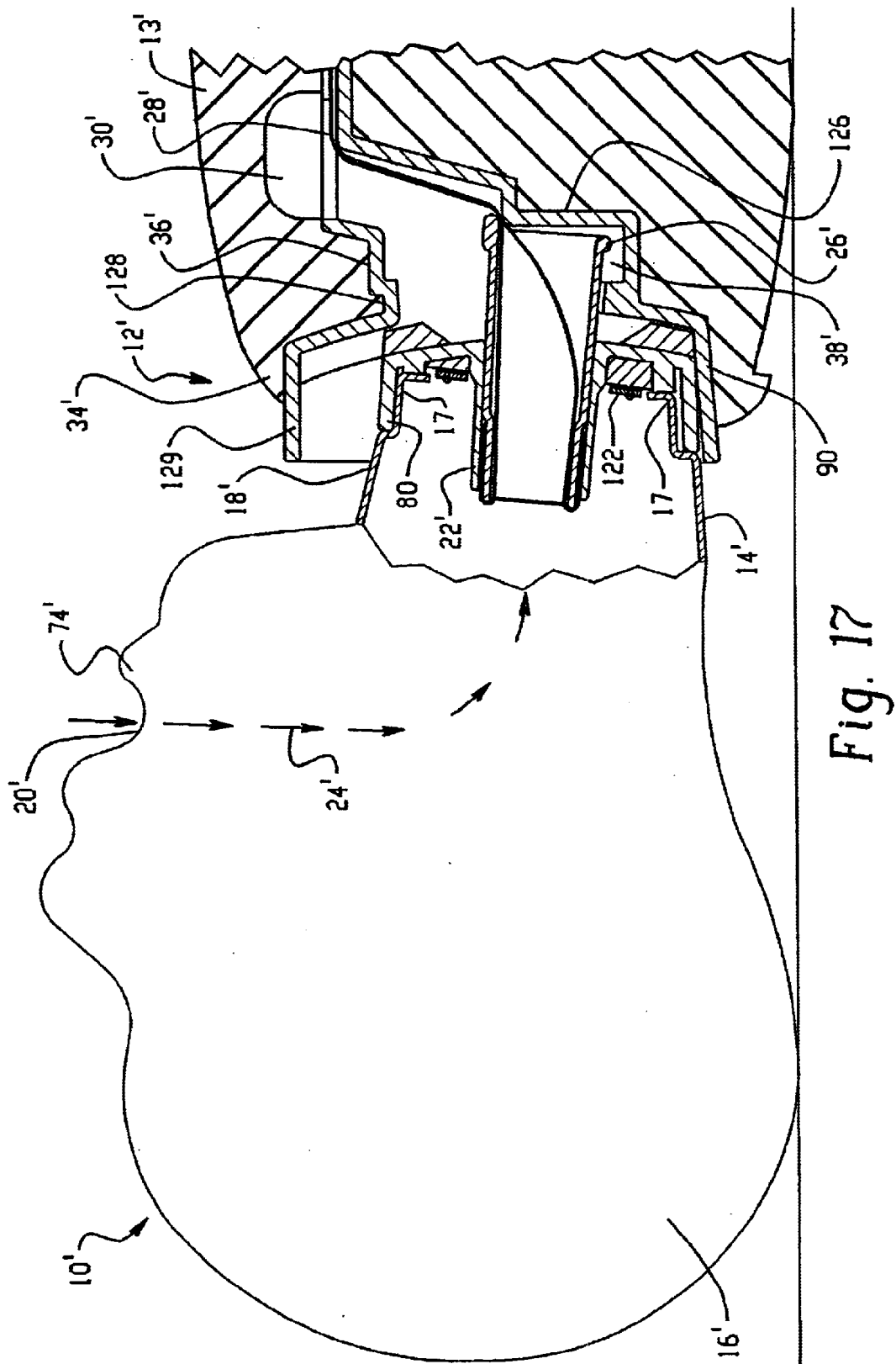
FIG. 17 is a schematic cut-away side view of the head simulation interconnected with the apparatus illustrated in FIG. 15, which is interconnected with the torso simulation, with the airway in the closed position.

The airway passage 24, 24' is in communication with an air piece 26, 26' of the neck attachment 14, 14' to allow air communication between the mouth opening 20, 20' and a lung bag 28, 28' located in a torso cavity 30, 30' within the torso simulation 12, 12'. In the preferred embodiment, the lung bag 28, 28', is illustrated in FIGS. 5 and 17, is a plastic film material.

In the adult/child embodiment of FIGS. 1–14, the torso simulation 12 includes the torso cavity 30 housing a compressible bellows unit 32 and the lung bag 28. The communication of the airway passage 24 and lung bag 28 allow for the teaching and practice of ventilation, while the compressible bellows unit 32 is used for teaching and practice of external heart massage.

The torso simulation 12 includes a shoulder area 34, 34' with a torso/neck attachment interface 36, 36'. Furthermore, the torso/neck attachment interface 36, 36' of the shoulder area 34, 34' has an opening 38, 38' therethrough to allow communication between the neck attachment 14, 14' and the torso cavity 30, 30'. An end portion 29, 29' of the lung bag 28, 28' is disposed through the opening 38, 38' to provide the aforementioned communication.

Figure 8:
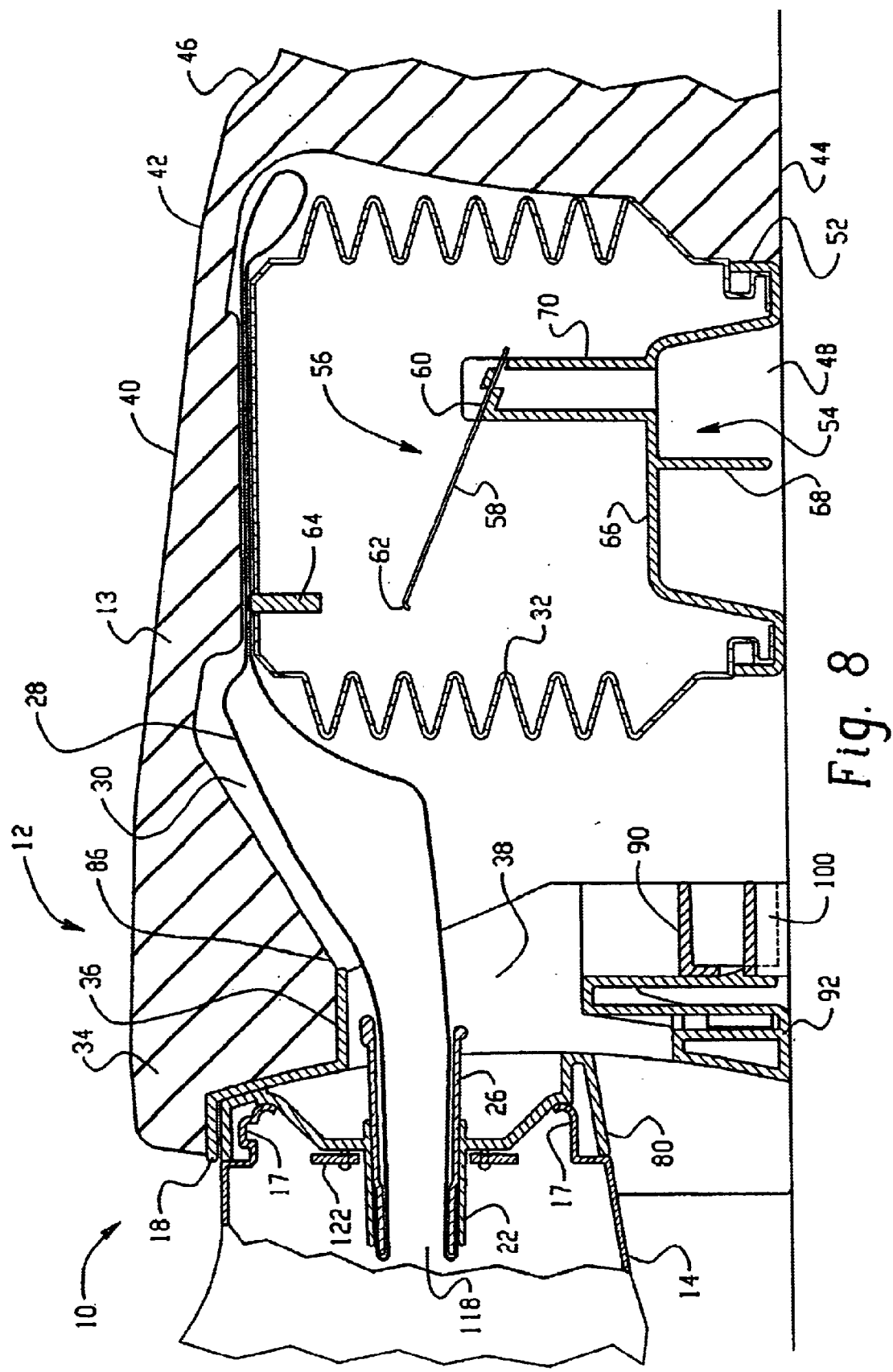
FIG. 8 is a schematic cut-away side view of the interconnected head simulation, neck attachment and torso simulation of FIG. 5, with the bellows selector shown in position for simulation external heart massage on a child.
Figure 20:
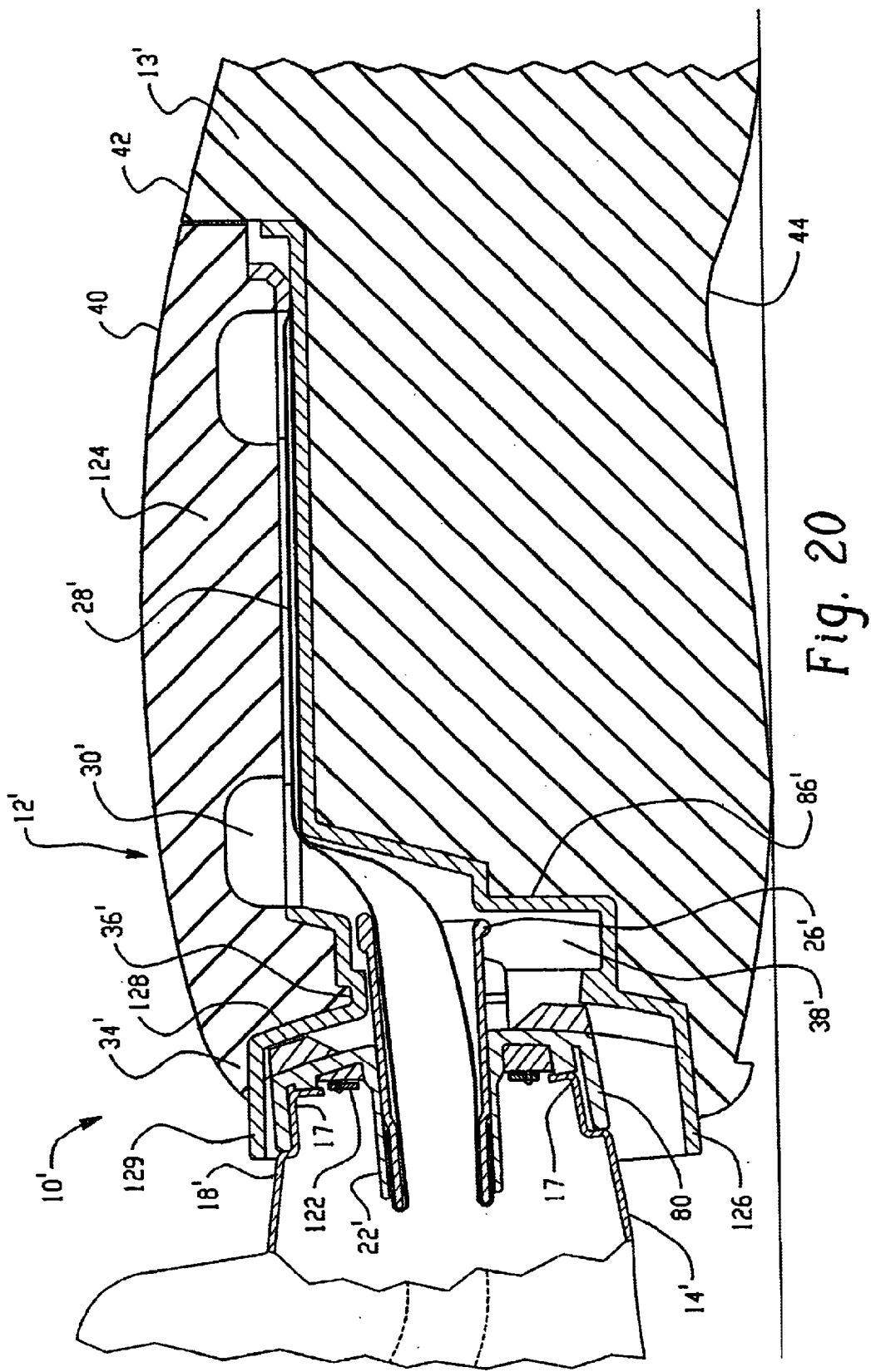
FIG. 20 is a schematic cut-away side view of the infant manikin of FIG. 18 with the torso simulation.

The torso simulation 12, 12' is formed from a compressible foam material. In the preferred and illustrated embodiment, the torso simulation is made of a flexible, low density foam polyurethane which is commonly available. Additionally, a resistive coating 40, 40' may be provided to the foam torso simulation to avoid wear, dirt and other substances such as cleaning fluids, as shown in FIGS. 8 and 20. The flexible, strong resistive coating 40, 40' is preferably added in commercial applications of the manikins 10, 10' where repeated use of the manikin occurs, also requiring frequent cleaning. Such a coating provides durability, as well as resistance to cleaning and cleaning chemicals. The coating maybe a vinyl, urethane, acrylic/latex or other suitable material.

Figure 12:
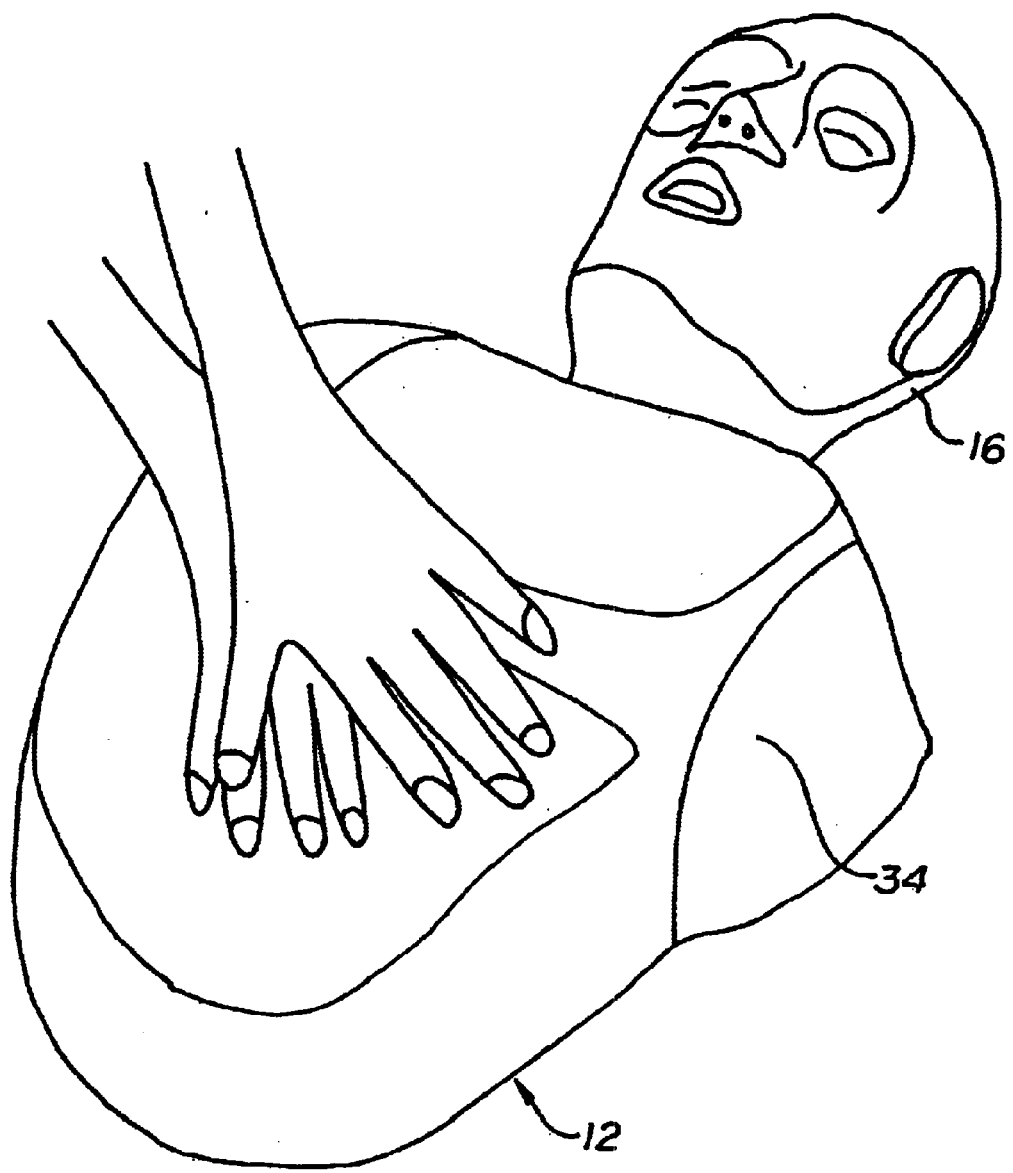
FIG. 12 illustrates the CPR manikin of the present invention being used to practice external heart massage.
Figure 13:
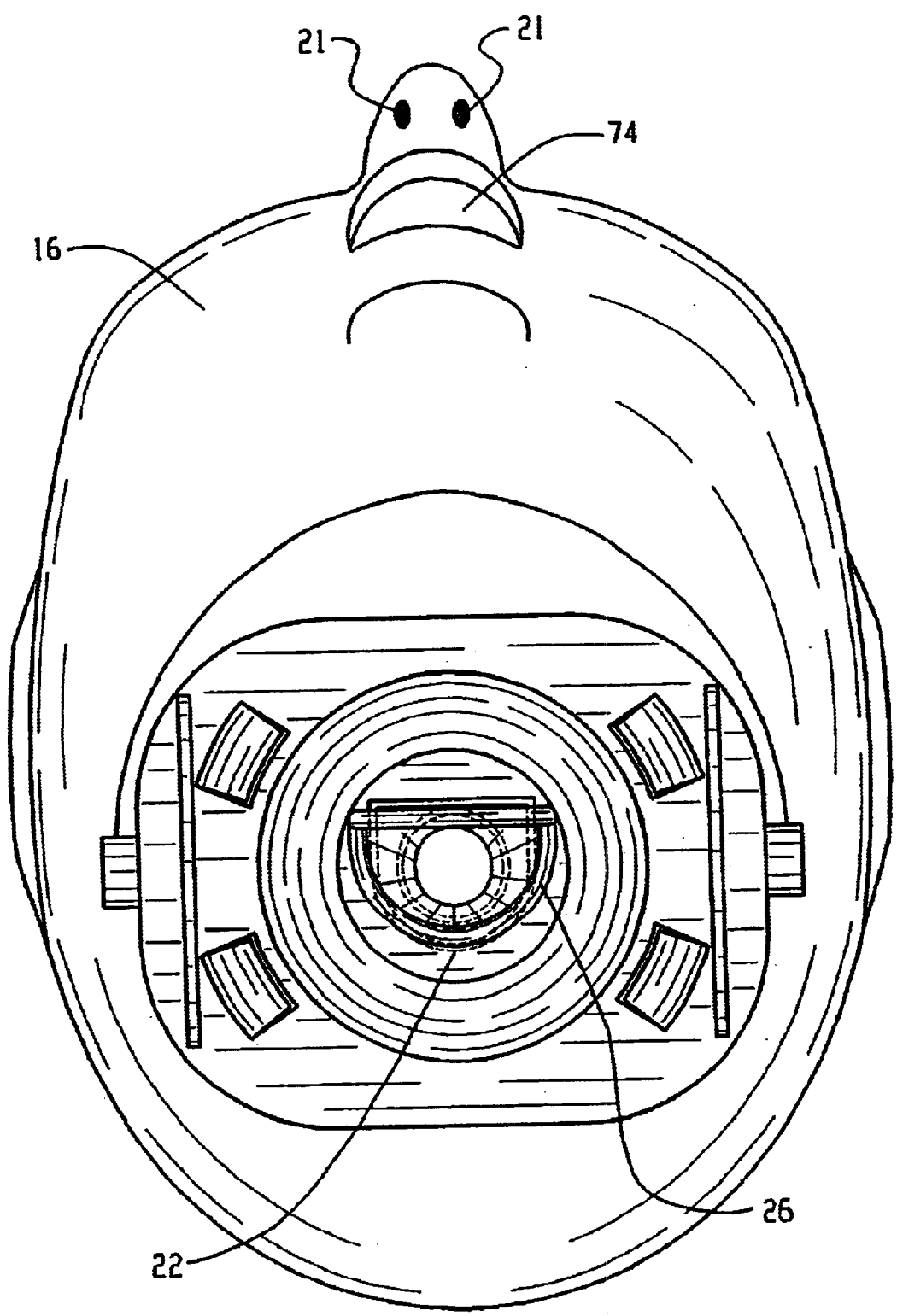
FIG. 13 is a torso side view of a mounting member of the neck attachment interconnected with the head simulation of the adult CPR manikin.
Figure 14:
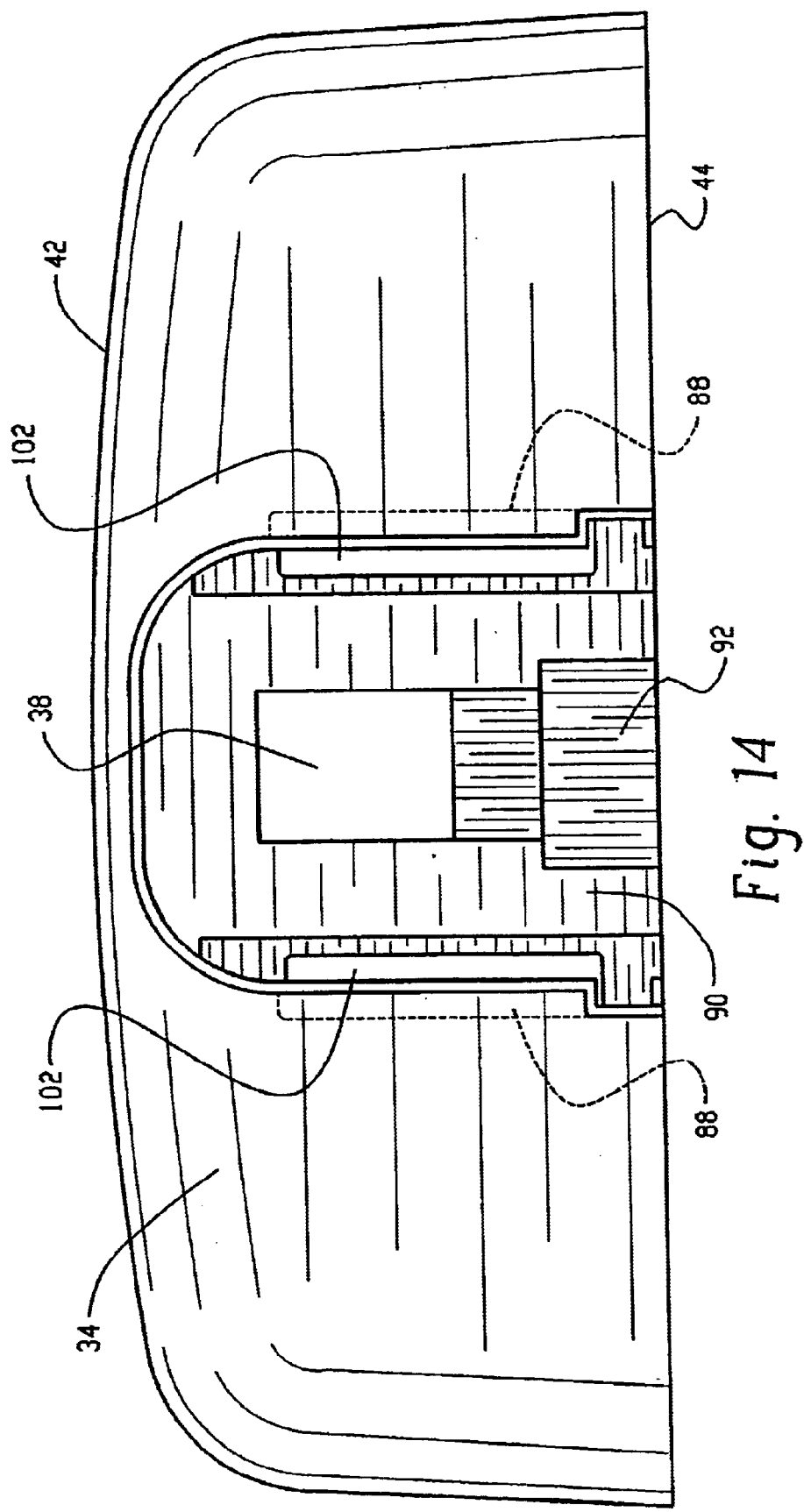
FIG. 14 is a head side view of a mounting plate of the neck attachment interconnected with the torso simulation of the adult CPR manikin.
Figure 15:
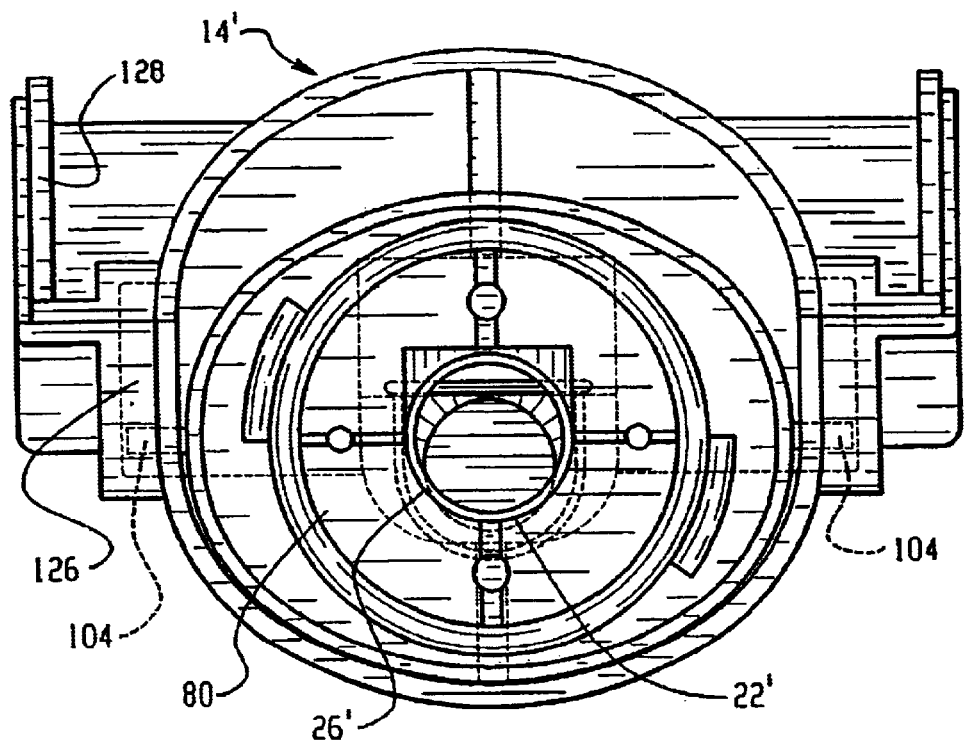
FIG. 15 is a head side view of a mounting member interconnected with a mounting plate/lung bag retainer of an infant CPR manikin of the present invention where the airway is in a closed position.
Figure 16:
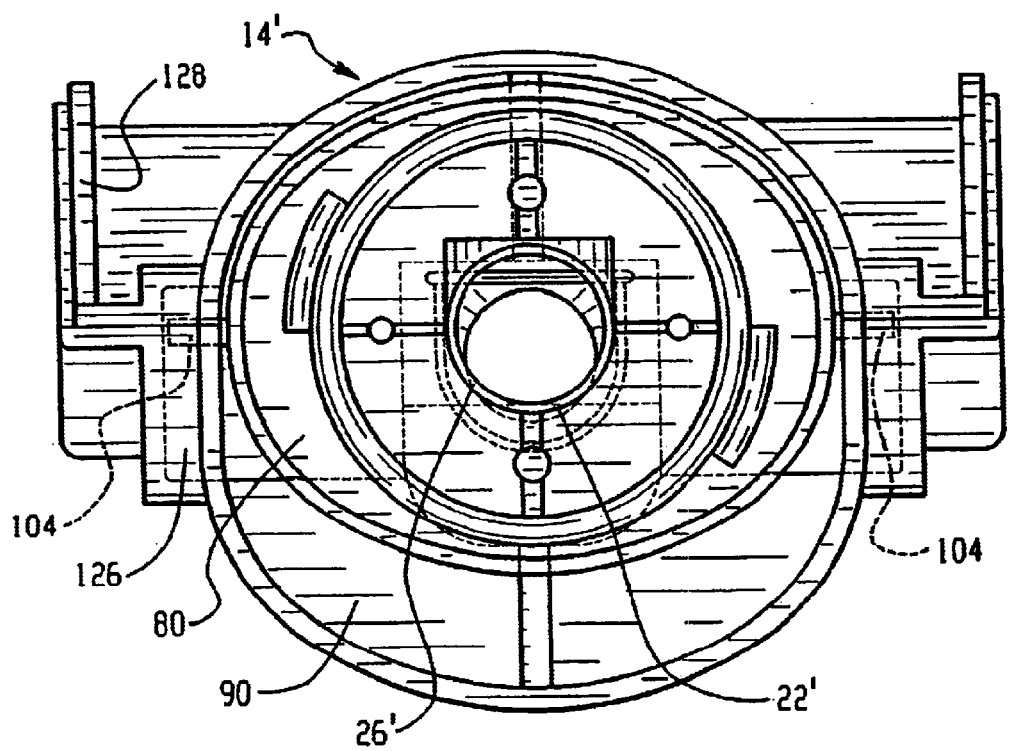
FIG. 16 is a head side view of the apparatus of FIG. 15, but where the airway is in an open position.

The torso simulation 12, 12' is made from a compressible material to allow the realistic instruction of external heart massage and other rescue techniques. The compressible materials allow a student or trainee to exert force upon the chest portion 13 of the torso simulation, as is illustrated in FIG. 12, and required in external heart massage. The manikin is designed to resemble the human form in order to provide anatomical markers for proper hand placement by the student during performance of the techniques. For example, the indentation 46 in the chest 13 of the torso simulation represents the contoured location of the xiphoid process of the sternum, which is to be avoided during external heart massage. These markers are used to teach proper positioning for ventilation, external heart massage and Heimlich maneuver instruction.

In the adult/child manikin 10, the torso simulation 12 has a back surface 44 and the external surface 42. The back surface 44 has an opening 48 which extends into the torso cavity 30. An inner surface 50 defines a ceiling of the torso cavity 30. The bellows 32 is positioned within and partially fills the torso cavity 30, with a mouth 52 of the bellows engaged with the opening 48. The diameter of the mouth 52 of the bellows is slightly larger than the diameter of the opening 48, such that the bellows is maintained in position within the cavity 30. The mouth 52 of the bellows 32 also engages a selector 54 which is also positioned within the opening 48 of the back surface 44 so that the bellows and selector are positioned in place within the torso cavity 30. The engagement of the selector 54 within the opening 48 of the back surface 44 is such that the selector 54 may be rotatable with respect to the bellows 32, which remains in position with respect to the torso cavity 30 during such rotation.

Figure 10:
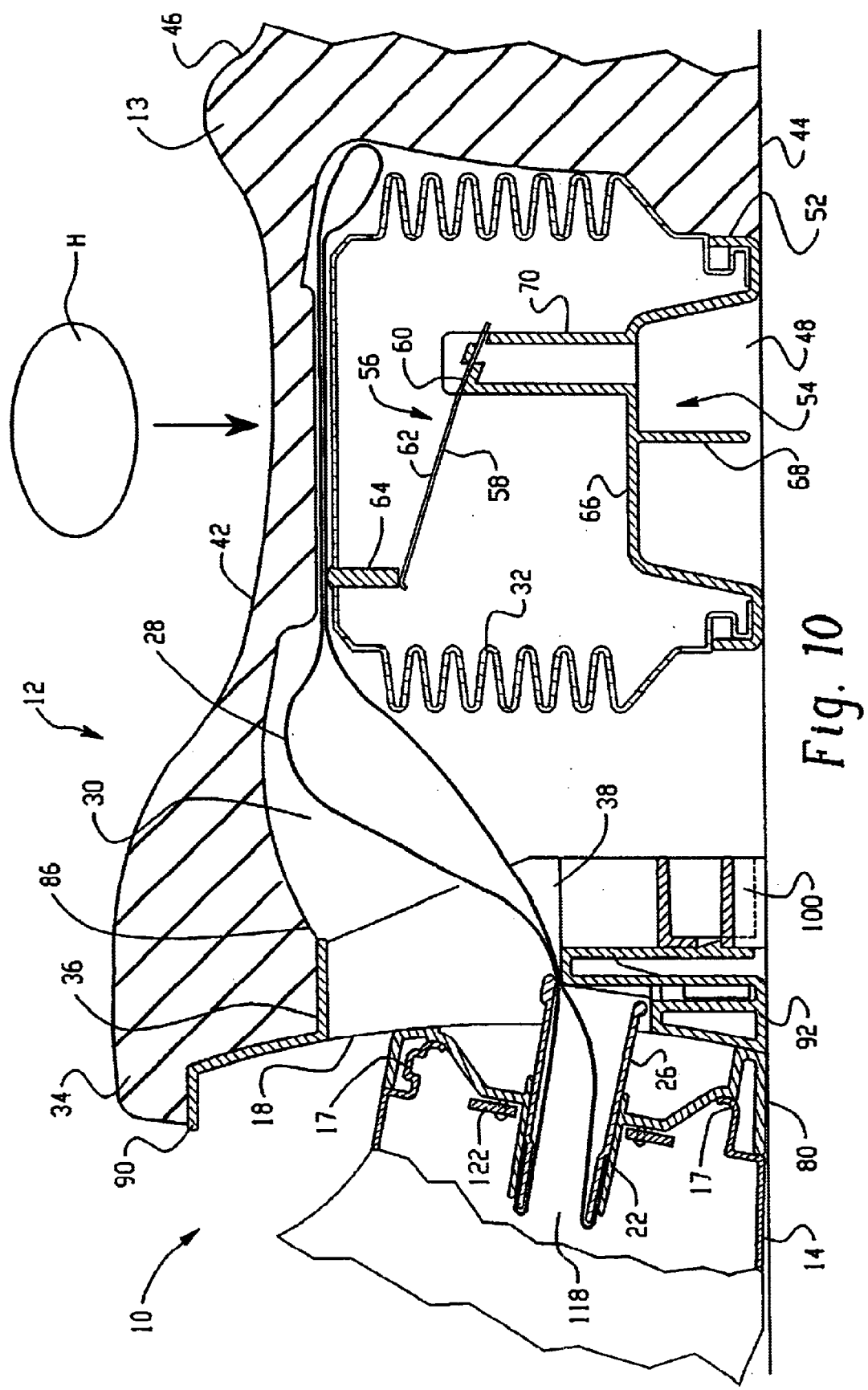
FIG. 10 is a schematic cut-away side view of the manikin of FIG. 7, but with the torso simulation compressed during external heart massage.
Figure 11:
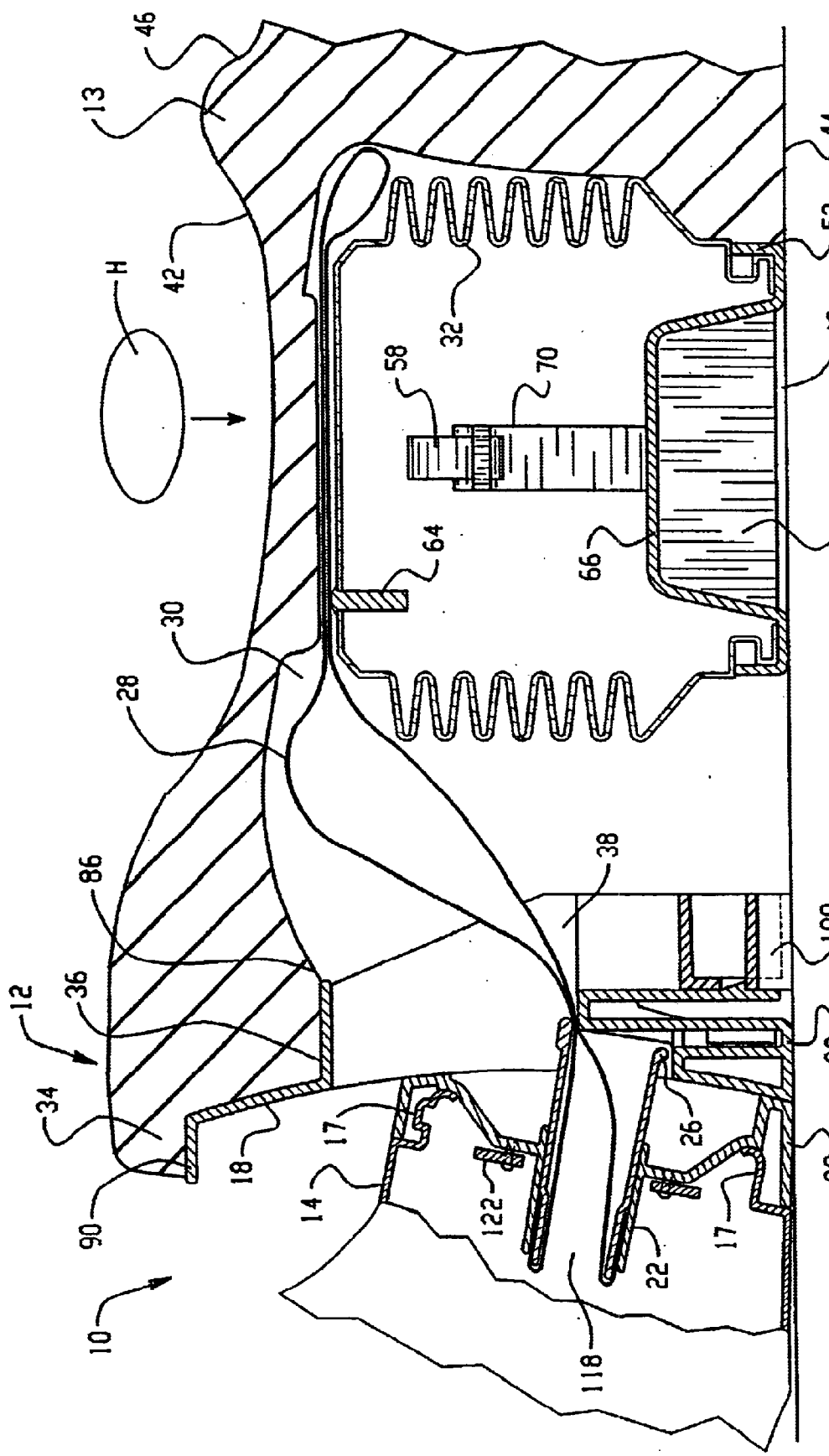
FIG. 11 is a schematic cut-away side view of the interconnected head simulation, neck attachment and torso simulation of FIG. 6, with a bellows selector shown in position for simulation of external heart massage on an adult, and with the torso simulation compressed during external heart massage.

The bellows 32 is preferably a cylindrical configuration. Disposed within the bellows 32 is a clicker apparatus 56, and the mouth 52 of the bellows is engaged within the selector 54. The clicker apparatus 56 is provided to give the CPR trainee audible feedback when the predetermined depth, depending on whether the selector 54 has been moved to the adult or child position, has been reached by application of adequate compression to the torso simulation during external heart massage. The clicker apparatus 56 is preferably a metal bar 58 with a relatively small thickness and some degree of flexibility. One end 60 of the clicker apparatus is attached to or disposed within the bellows so that an unattached end 62, opposite the one end 60, is positioned as illustrated in FIG. 10. As seen in FIG. 10, a clicker pin 64 is attached to and extends from an inner surface 66 of the bellows 32.

As stated above, the selector 54 is rotatably mounted with the mouth 52 of the bellows and includes a handle portion 68 and a selector column 70. The selector is manually rotated using the handle portion 68. The selector 54 can be set in one of two positions. In the first position, for simulating child CPR, the bellows selector is set so that during external heart massage, if the chest of the torso simulation is properly compressed, the clicker pin 64 will deflect the clicker to provide the trainee with audible feedback that external heart massage was correctly performed. In the second position, for simulating adult CPR, the bellows selector is rotated so that when the chest of the torso simulation is compressed, the clicker pin does not engage the clicker. Thus, less compression is required to engage the clicker with the pin than is required to engage the clicker pin with the inner surface 66 of the bellows 32. Accordingly, the selector is positioned so that the metal bar 58 engages the pin 64 to simulate less compression for heart massage performed on a child. In the preferred embodiment, this is a depth of approximately 1 to 1.5 inches. When adult CPR is desired, the selector 54 is positioned such that the inner surface 66 of the bellows engages the clicker apparatus 66. In the preferred embodiment, this is a depth of approximately 1.5 to 2 inches.

As mentioned above, disposed within the torso cavity 30, 30' is a disposable lung bag 28, 28'. In the embodiments of FIGS. 5, 5A, 6–11, 17, 17A, and 18–21, the lung bag 28, 28' is designed to be connected to the air piece 26, 26' of the neck attachment 14, and is contained within the torso cavity 30, 30'. In the adult manikin, the lung bag 28 rests on top of the bellows 32.

Figure 5A:
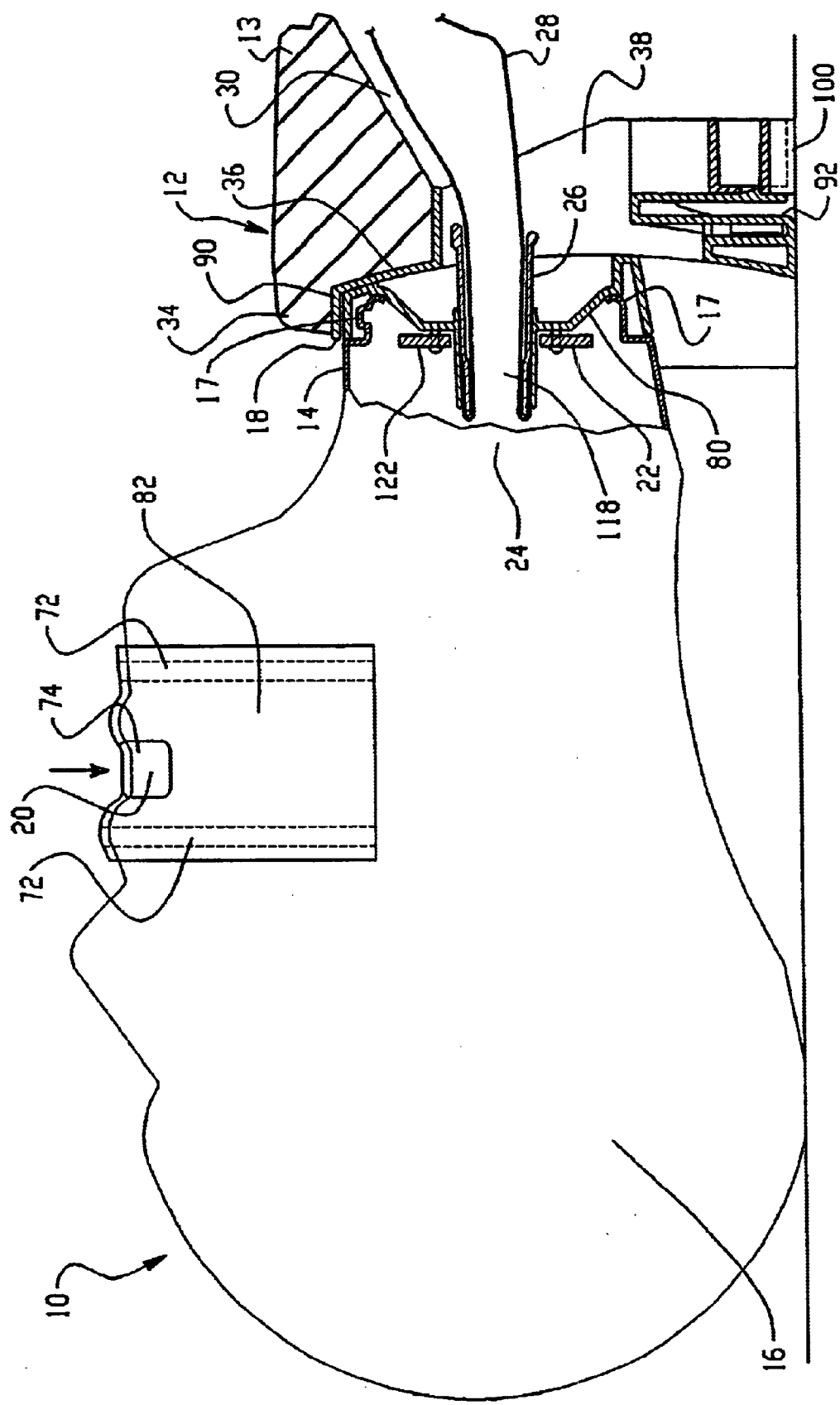
FIG. 5A is a schematic cut-away side view of the apparatus of FIG. 5, with a filter membrane covering the mouth opening.
Figure 5B:
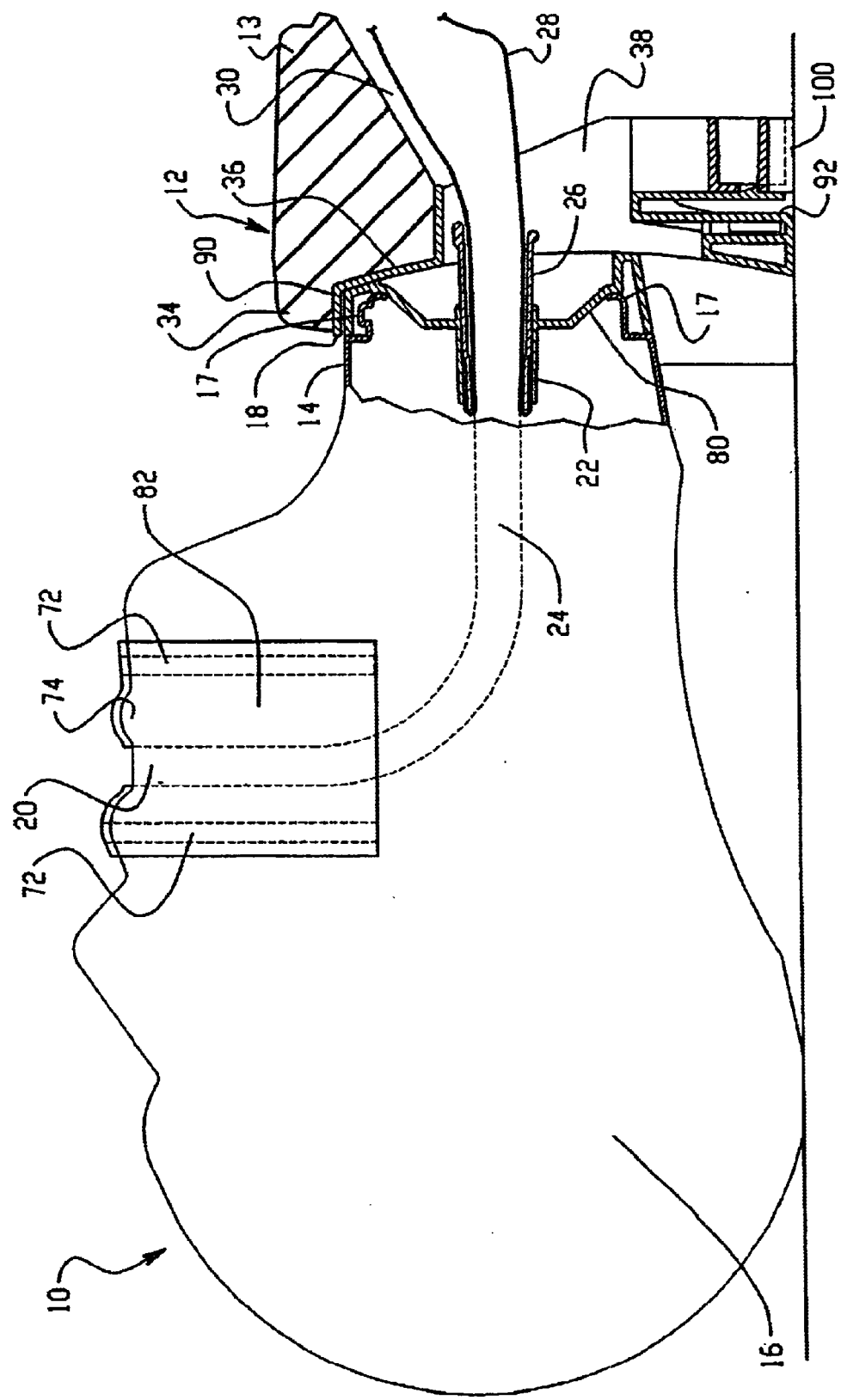
FIG. 5B is a schematic cut-away side view of the apparatus of FIG. 5, with an alternate embodiment of the lung bag.
Figure 5C:
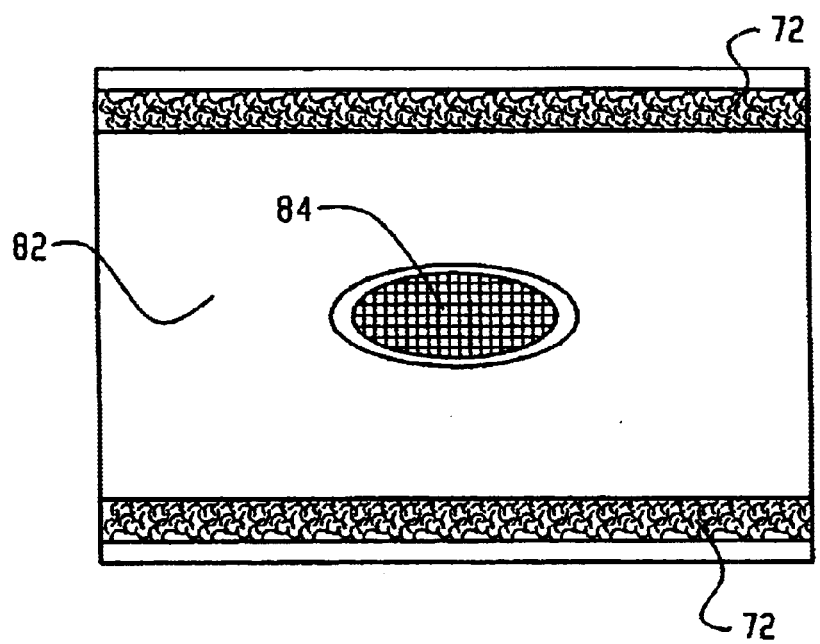
FIG. 5C illustrates the filter membrane shown in FIG. 5A.
Figure 5D:
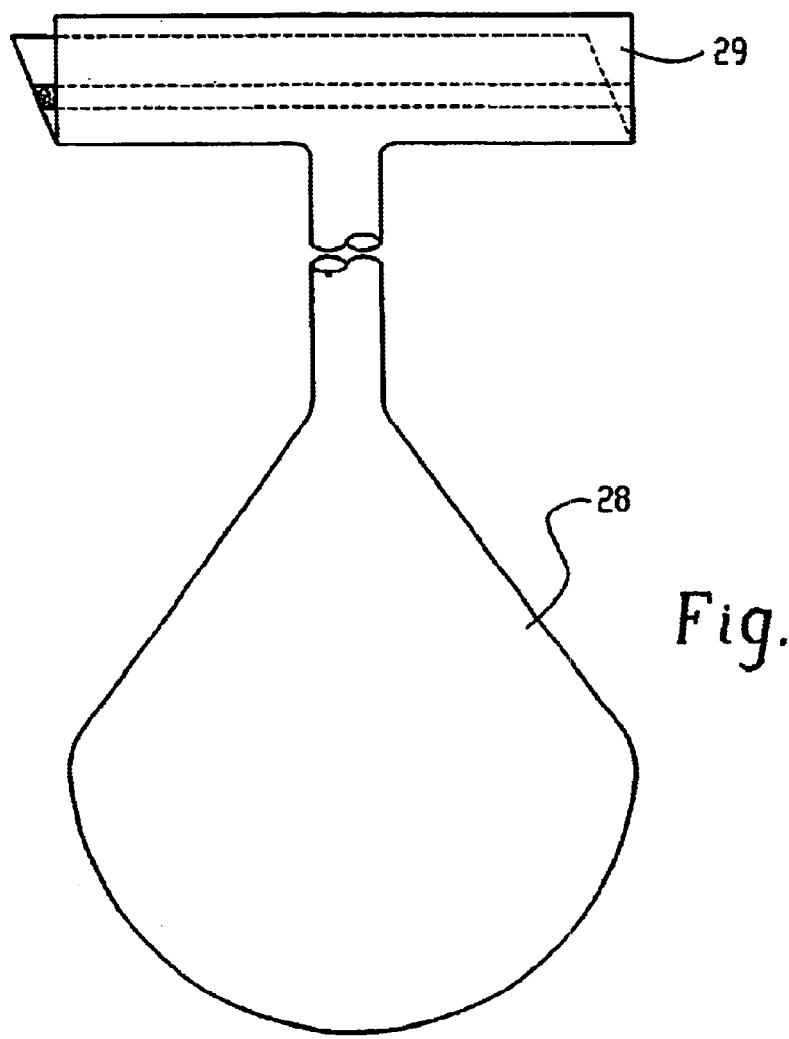
FIG. 5D illustrates the alternate embodiment of the lung bag illustrated in FIG. 5B.
Figure 17A:
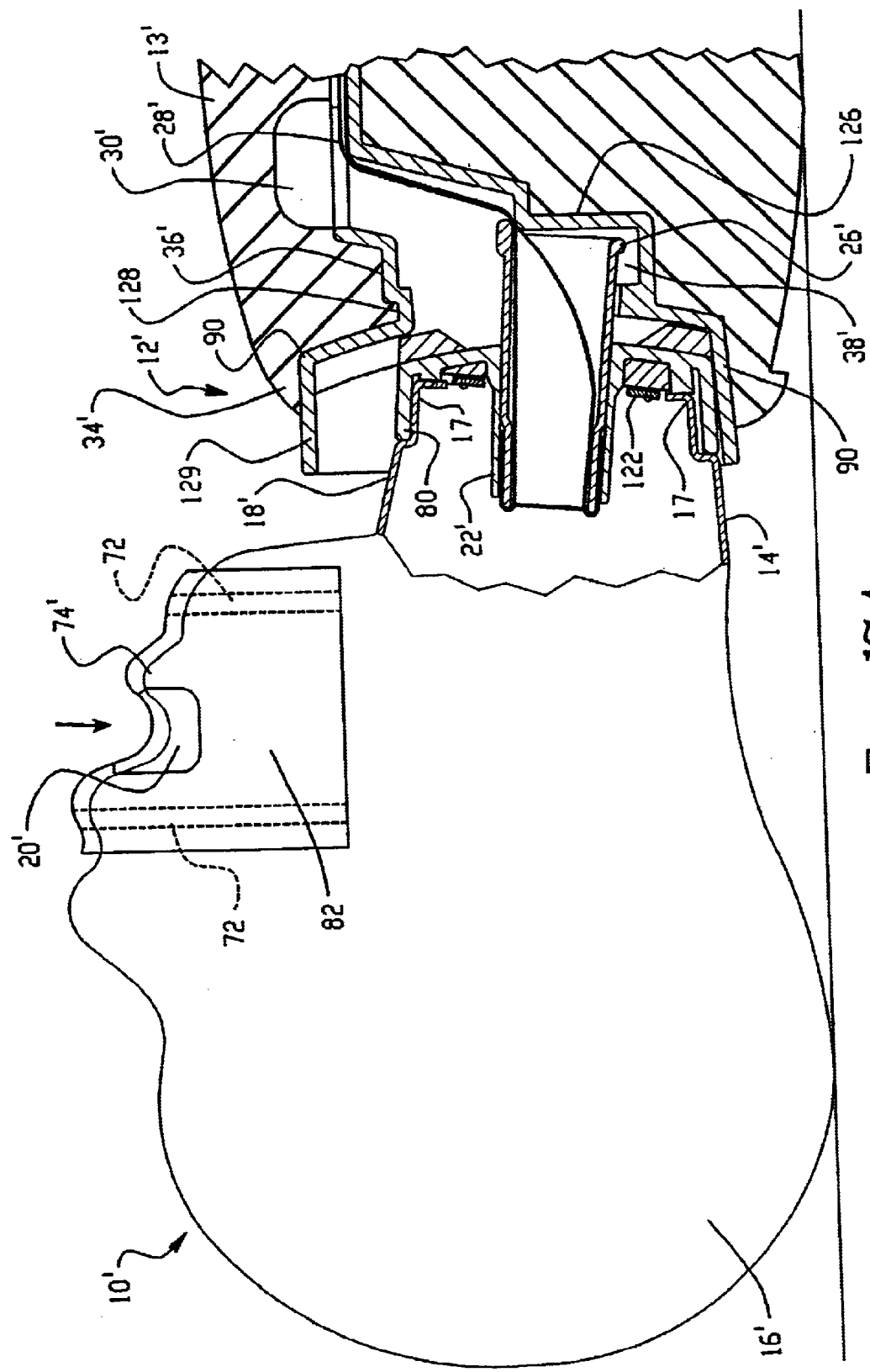
FIG. 17A is a schematic cut-away side view of the apparatus of FIG. 17, with the filter membrane covering the mouth opening.
Figure 17B:
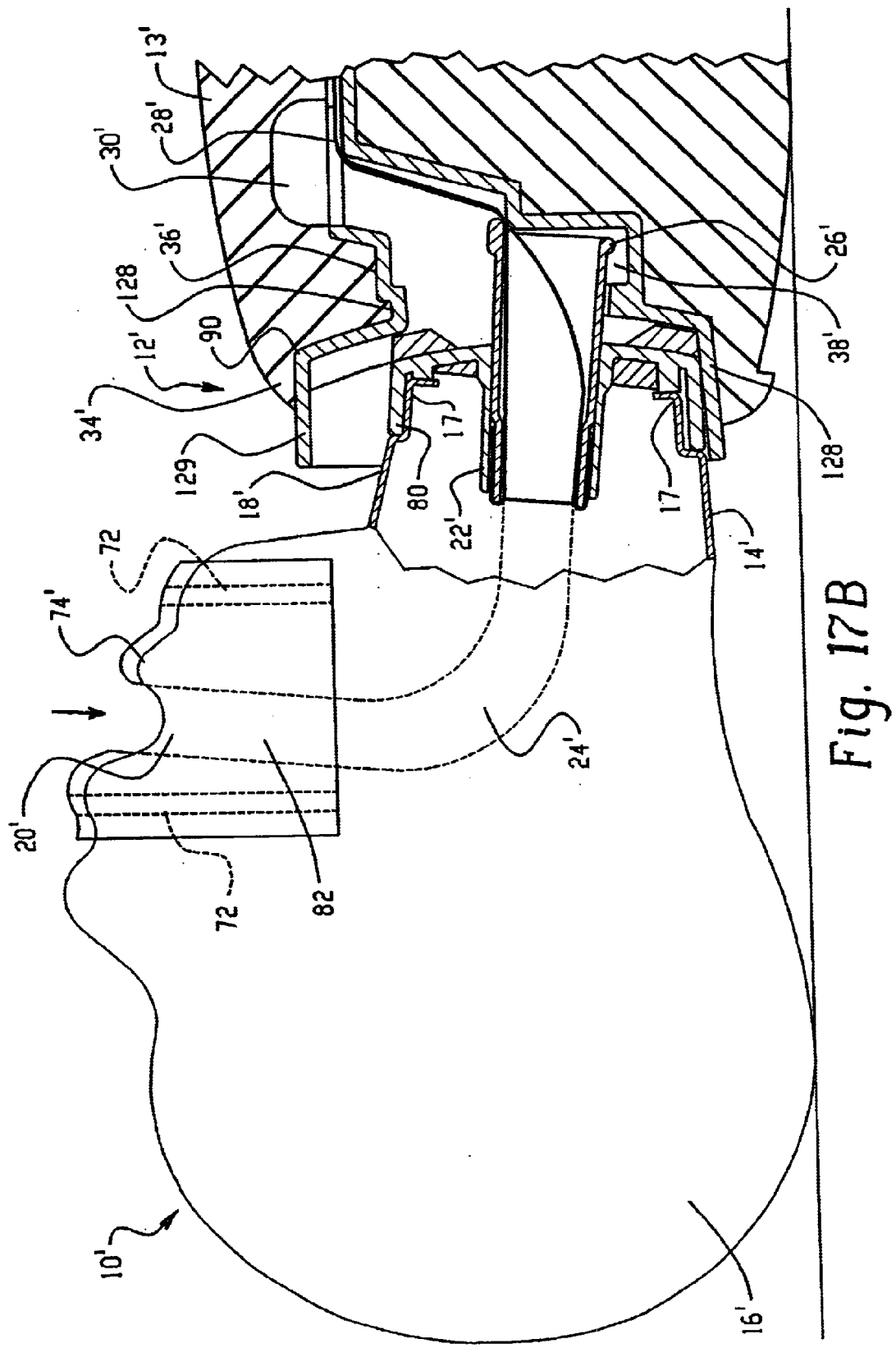
FIG. 17B is a schematic cut-away side view of the apparatus of FIG. 17, with an alternate embodiment of the lung bag.
Figure 18:
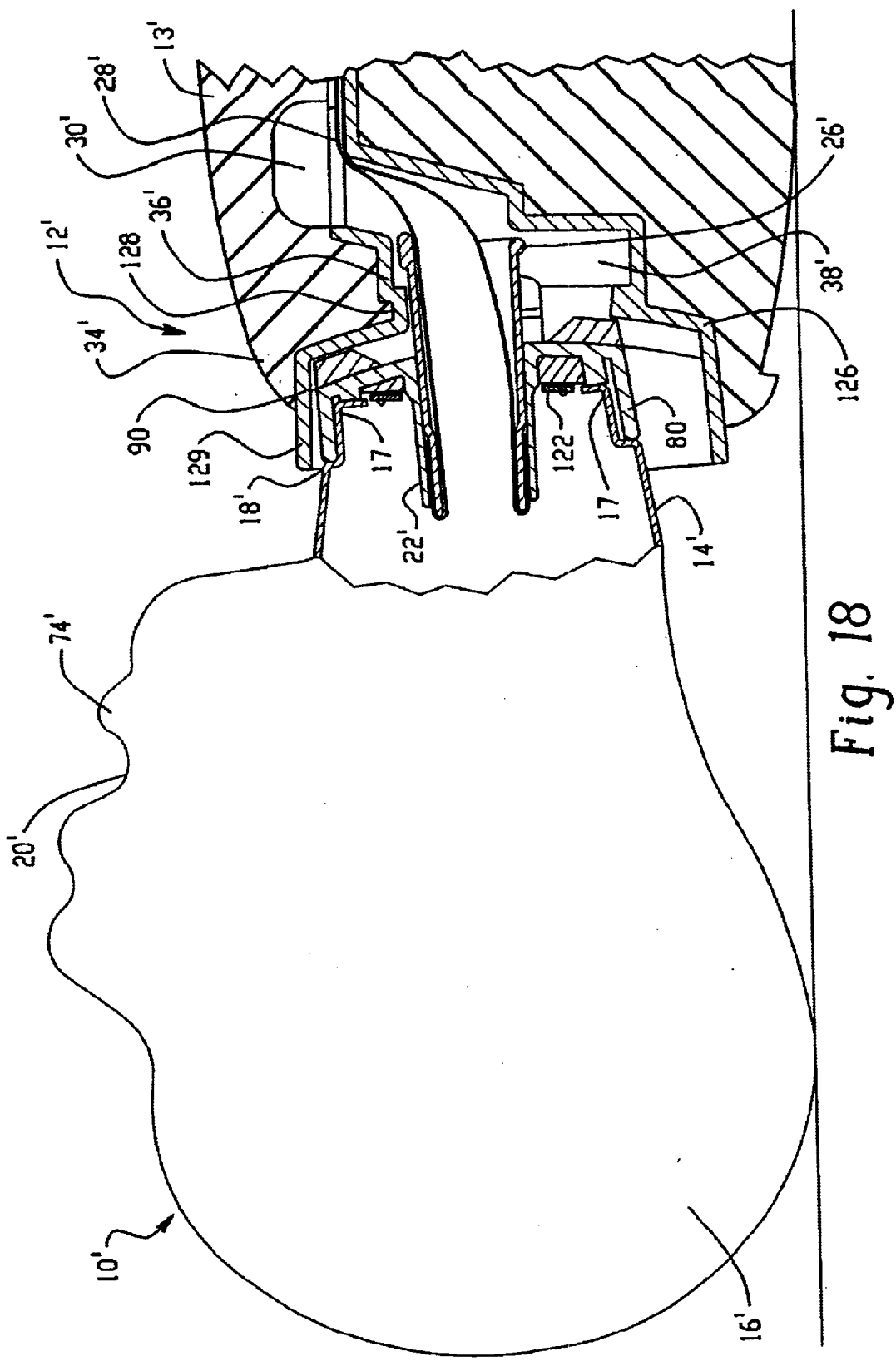
FIG. 18 is a schematic cut-away side view of the infant manikin of FIG. 17, with the airway in the open position.

In a second embodiment, shown in FIGS. 5B and 17B, the lung bag 28, 28', as illustrated in FIG. 5D, passes through the mouth opening 20, 20' and the air piece 26, 26' within the neck attachment and is contained within the torso cavity 30, 30'. The illustrated lung bag 28, 28' has an adhesive area 70 at its open end 29. The open end 29, 29' of the lung bag is pulled or inserted through the mouth opening of the head simulation so that the adhesive area 70 of the lung bag may be adhered to an external surface of a lip area 74, 74' surrounding the mouth opening 20, 20' of the head simulation 16, 16'. The lung bag is then placed through the neck opening 22, 22' and into the neck attachment 14, 14' passing through the air piece 26, 26', and an opening 78 in a mounting member 80 so that the lung bag is disposed within the torso cavity. It is contemplated that this apparatus will be used in classroom type training scenarios where only a single manikin is available for an entire class, so for health reasons, each pupil will have their own disposable lung bag.

In a still further third embodiment, illustrated in FIGS. 5A and 17A, a lung bag as described in connection with the first embodiment is used, however, in addition, a mask 82 to cover the mouth opening 20, 20' of the head simulation is provided. As shown in FIG. 5C, the mask 82 has a filter media 84 through which air may pass, but which will resist contaminant flow. Additionally, the mask has an adhesive area 72' as illustrated to secure the mask 82 in position on the head simulation. In this embodiment, each student in a class would have their own mask.

Figure 9:
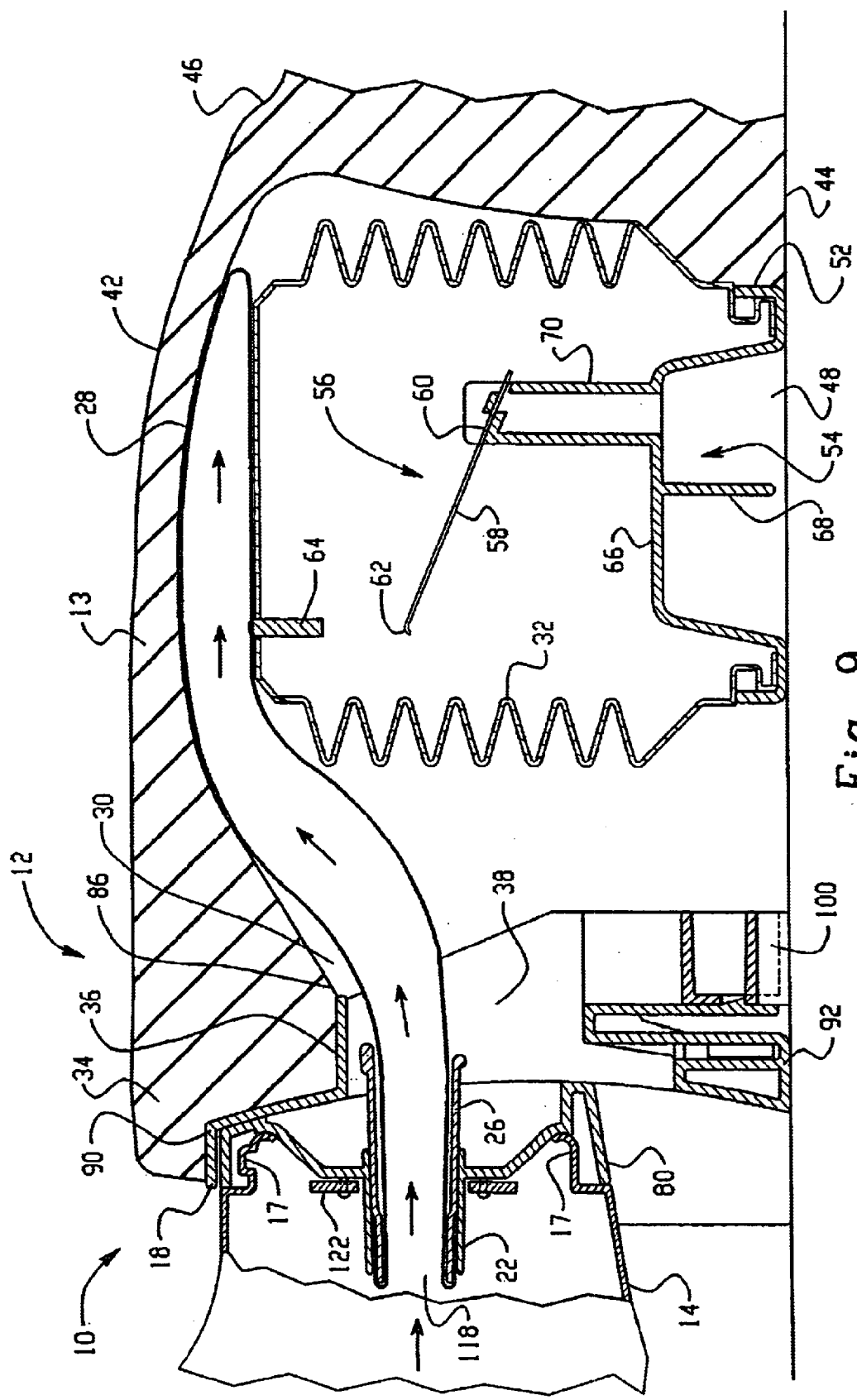
FIG. 9 is a schematic cut-away side view of the manikin of FIG. 8, but with a lung bag inflated during ventilation.
Figure 21:
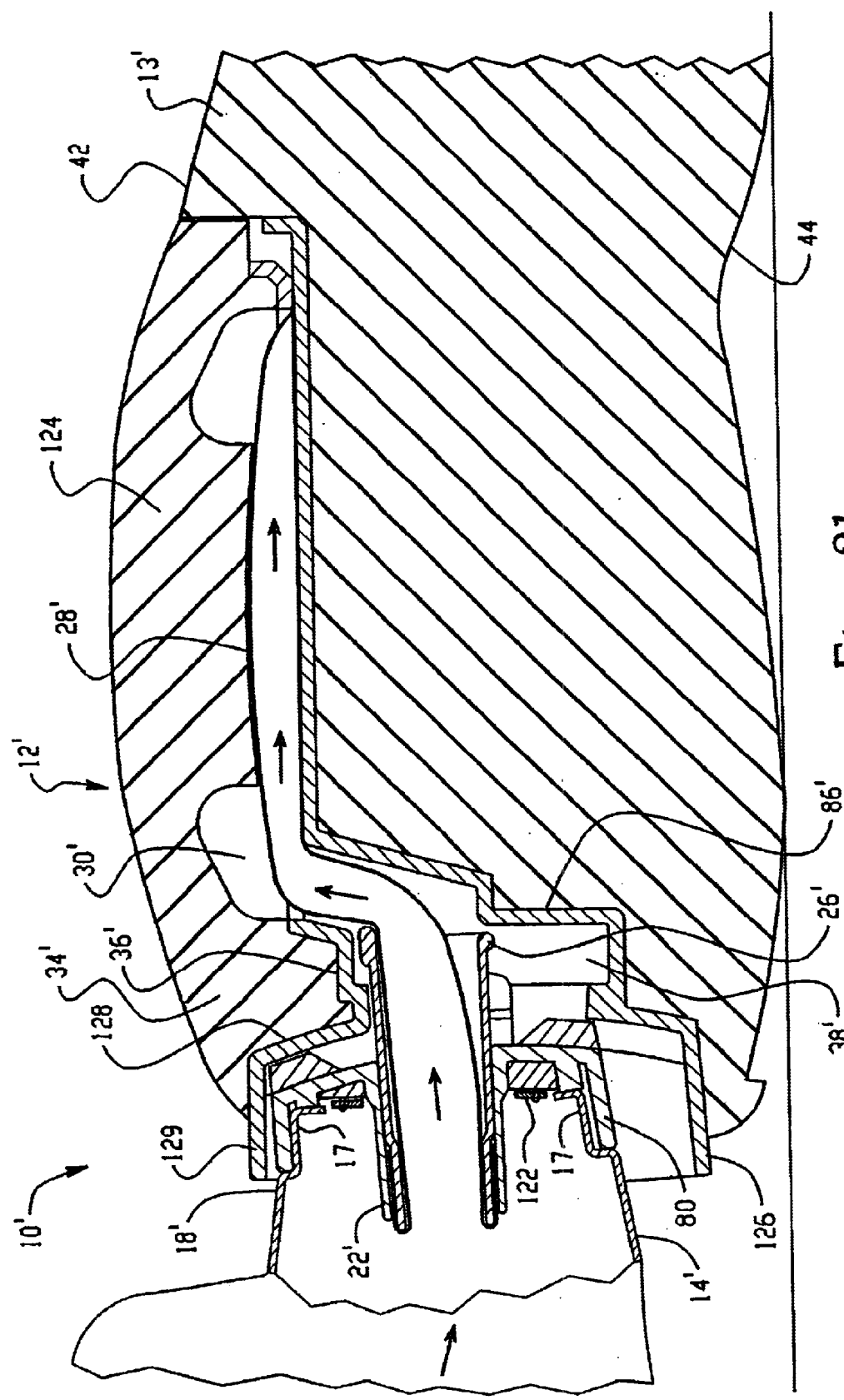
FIG. 21 is a schematic cut-away side view of the infant manikin of FIG. 20, but with a lung bag inflated during ventilation.
Figure 22:
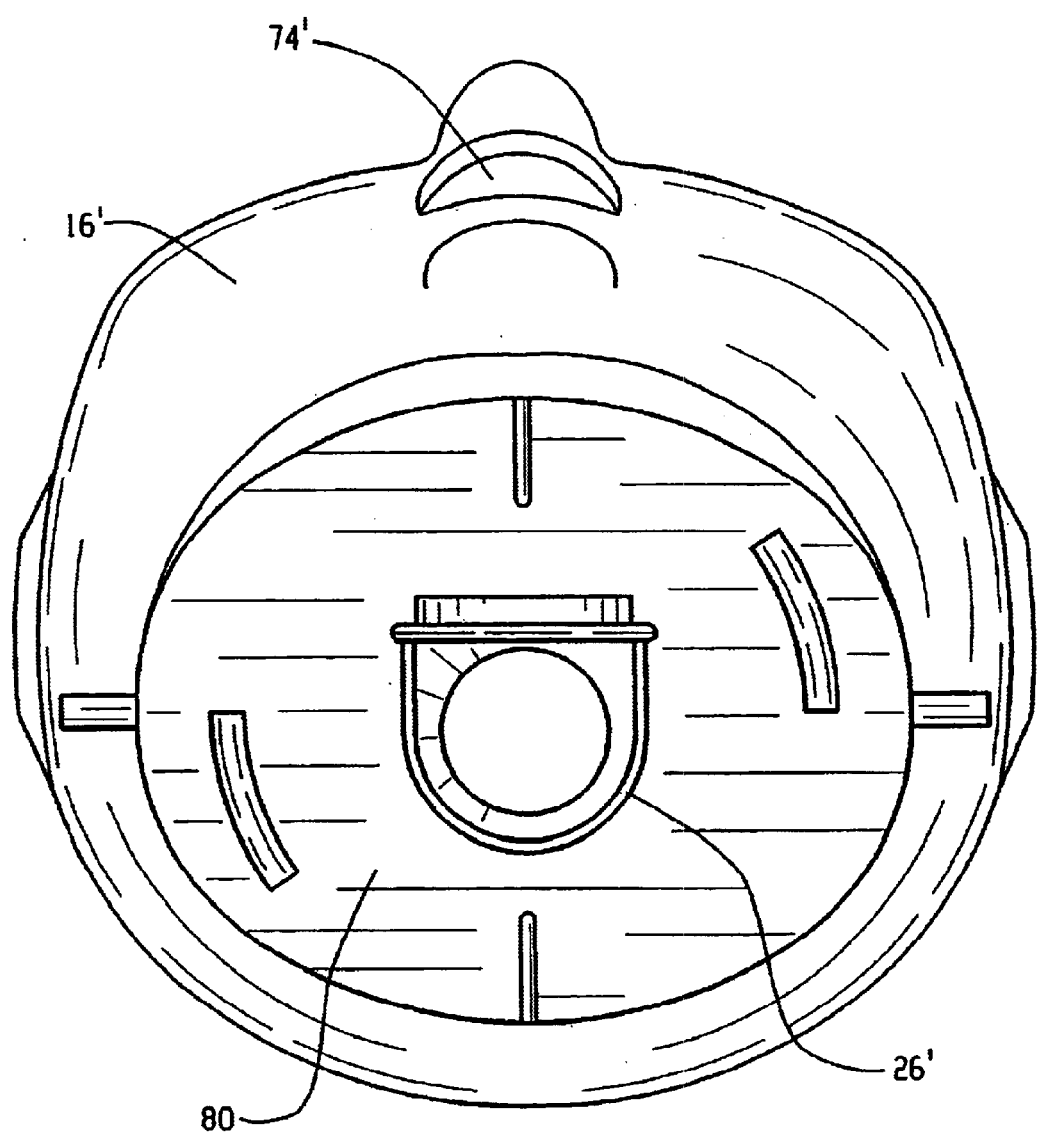
FIG. 22 is a torso side view of a mounting plate of the neck attachment interconnected with the head simulation of the infant CPR manikin.
Figure 23:
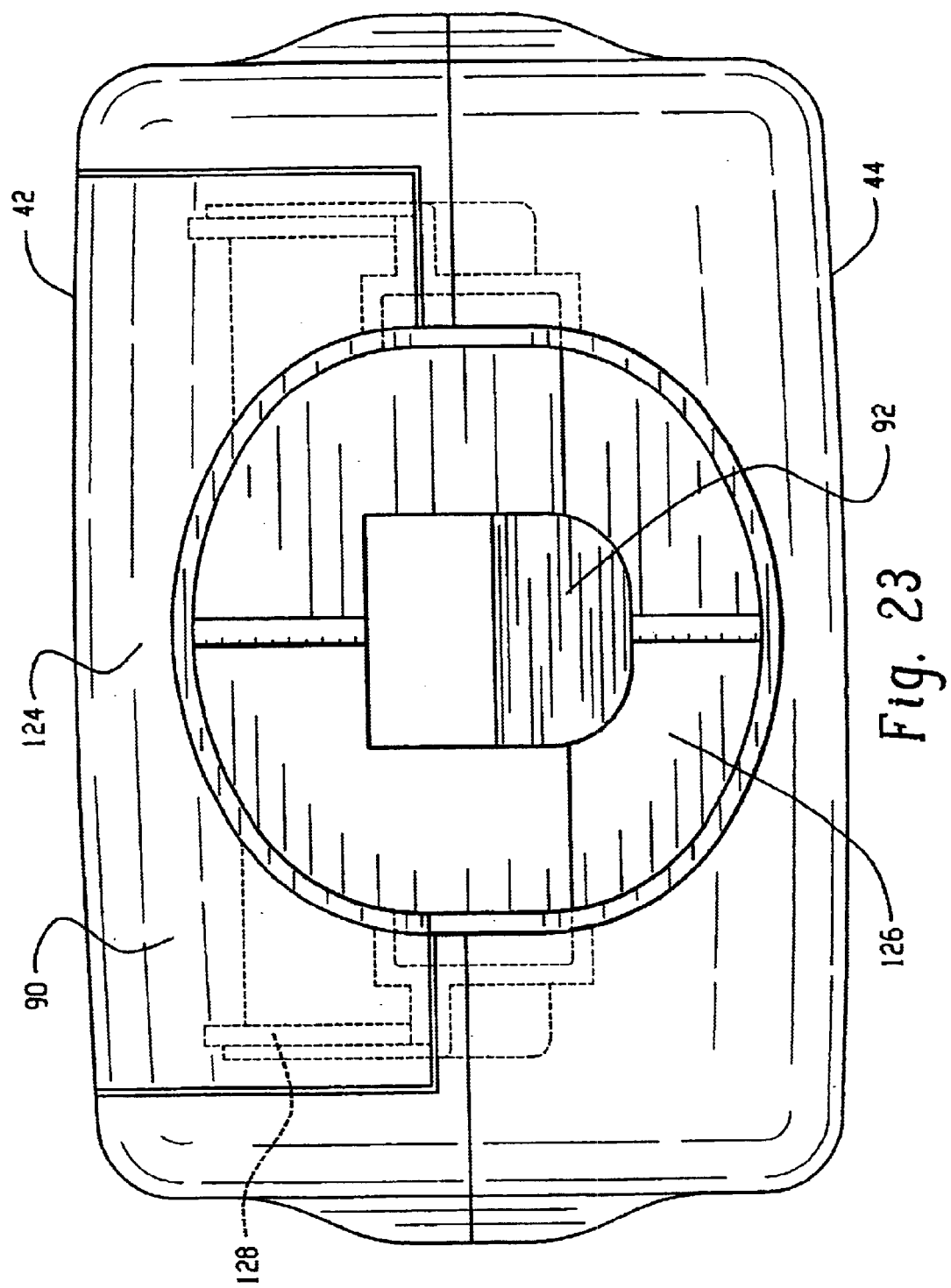
FIG. 23 is a head side view of a mounting plate/lung bag retainer interconnected with a torso simulation of the infant CPR manikin.

During ventilation practice and training, if the trainee properly fills the lung bag 28, 28' with air, the lung bag will expand and press against the torso simulation 12, 12' thereby forcing the simulation upward, as shown in FIGS. 9 and 21. If the trainee performs proper ventilation, the manikin will appear to "breathe." Thus, by appearing to breathe, the manikin provides visual feedback to the trainee.

The shoulder area 34, 34' of the torso simulation is configured with a neck attachment receiving area 86, 86'. The neck attachment receiving area has an airway opening 88, 88' therethrough to provide communication between the mouth opening of the head simulation and the lung bag once the head simulation, neck attachment and torso simulation are interconnected. The neck attachment receiving area 86, 86' is configured to allow the neck attachment 14, 14' to be connected to the torso simulation.

Referring to FIGS. 1–5B, the neck attachment of the adult manikin can be seen. The neck attachment 14 interconnects the torso simulation 12 with the head simulation 16. This interconnection enables the airway passage 24 to be opened and closed so that communication is established from the mouth opening of the head simulation through the airway passage and neck attachment to the lung bag. The neck attachment 14 includes a mounting plate 90 with a stop 92, a slideable mounting member 94 and the removable air piece 96.

In a preferred embodiment, the mounting plate 90 of the neck attachment, as best seen in FIGS. 1, 3, 5 and 6–11, has two opposing flange members 98 and a base flange 100. These flanges are insertable into corresponding flange receiving slots 90 of the neck torso interface of the shoulder area of the torso simulation. Each flange is inserted into its respective flange receiving slot 90 within the torso simulation, and, using an adhesive, the mounting plate may be permanently affixed to the torso simulation, as illustrated.

Figure 1:
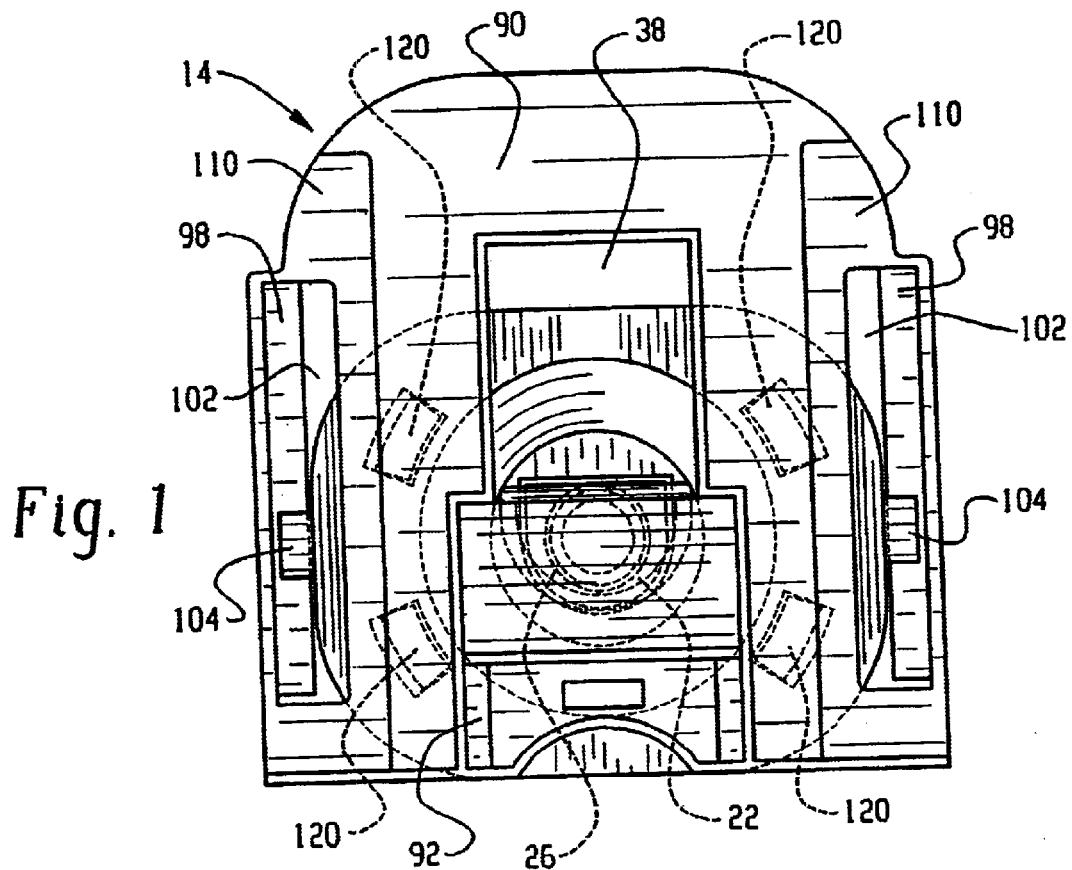
FIG. 1 illustrates a torso side view of a neck attachment of an adult CPR manikin of the present invention where an airway is in a closed position.
Figure 3:
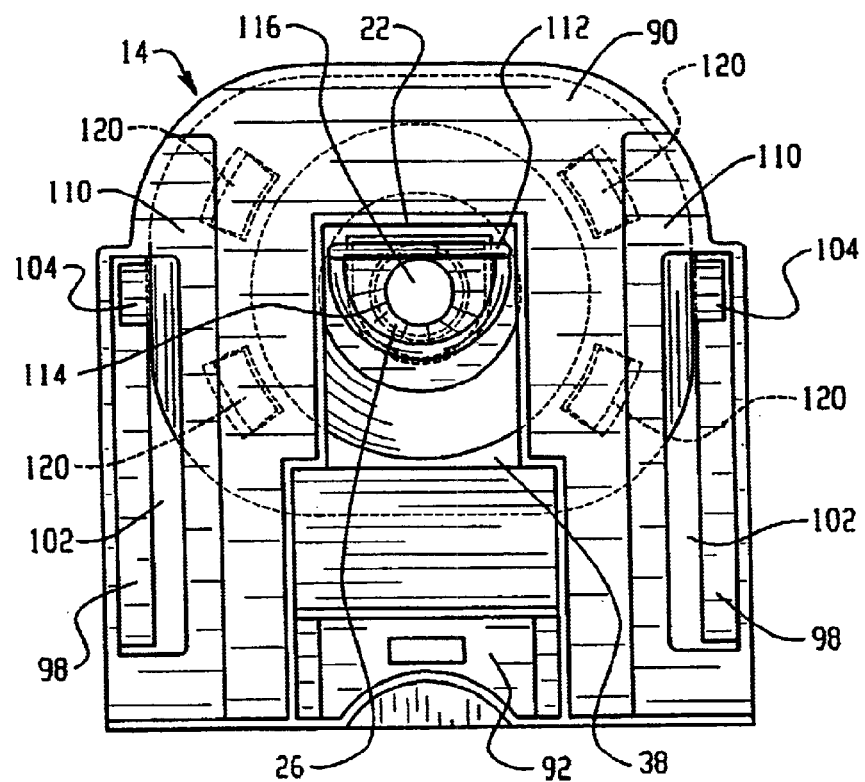
FIG. 3 illustrates the torso side view of the neck attachment of FIG. 1, but with the airway in an open position, such that an interconnected head simulation is in a tilted position.

As can be best seen in FIGS. 1, 3 and 5, the mounting plate 90 has two arcuate channels 102 into which mounting pins 104 located on the mounting member 80 are inserted. Each of the opposing flange members 98 includes walls 106 defining surfaces of the arcuate channels 102 and a shoulder 108 defining each channel. The shoulder 108 is shorter than the wall to facilitate movement of the pins 104 into and out of the arcuate channels 102. Also, a ramp 110 allows easy insertion of the pins into their respective channels. As shown, each shoulder 108 has an inner surface at substantially a right angle to the bottom of said channel to inhabit inadvertent movement of the pins out of the channel. Once the mounting pins are inserted into the corresponding arcuate channels of the mounting plate, the mounting member is then slideable within the arcuate channels. The pins are contained within the channels as they rest against the walls 106.

As best seen in FIGS. 1–4, the mounting member opening 78 receives the air piece 26. The air piece 26 has an upper lip surface 112, a lung bag engaging surface 114 and a central opening 116 therethrough. In a preferred embodiment, an opening 118 of the disposable lung bag is designed to be inserted through an opening 91 in the mounting plate 90, mounting member opening 78 and central opening 116 in the air piece, and then to slide over the lung bag engaging surface 114 and be folded over upon itself to secure the bag in place. In the embodiment of FIGS. 5B and 17B, the lung bag is merely inserted through the air piece.

Figure 6:
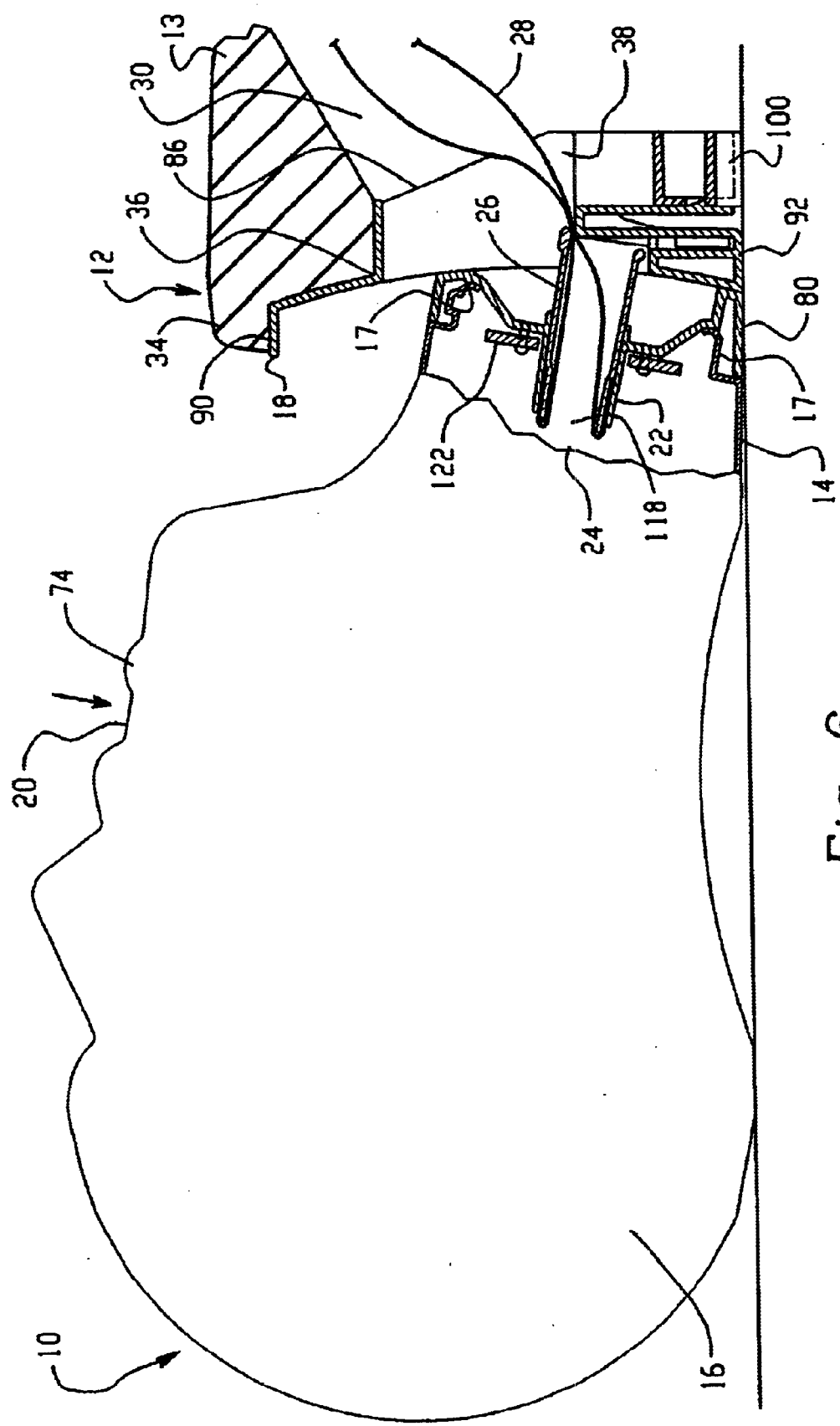
FIG. 6 is a schematic cut-away side view of the head simulation interconnected with the neck attachment, which is interconnected with the torso simulation, with the airway in the closed position as shown in FIGS. 1 and 2.
Figure 7:
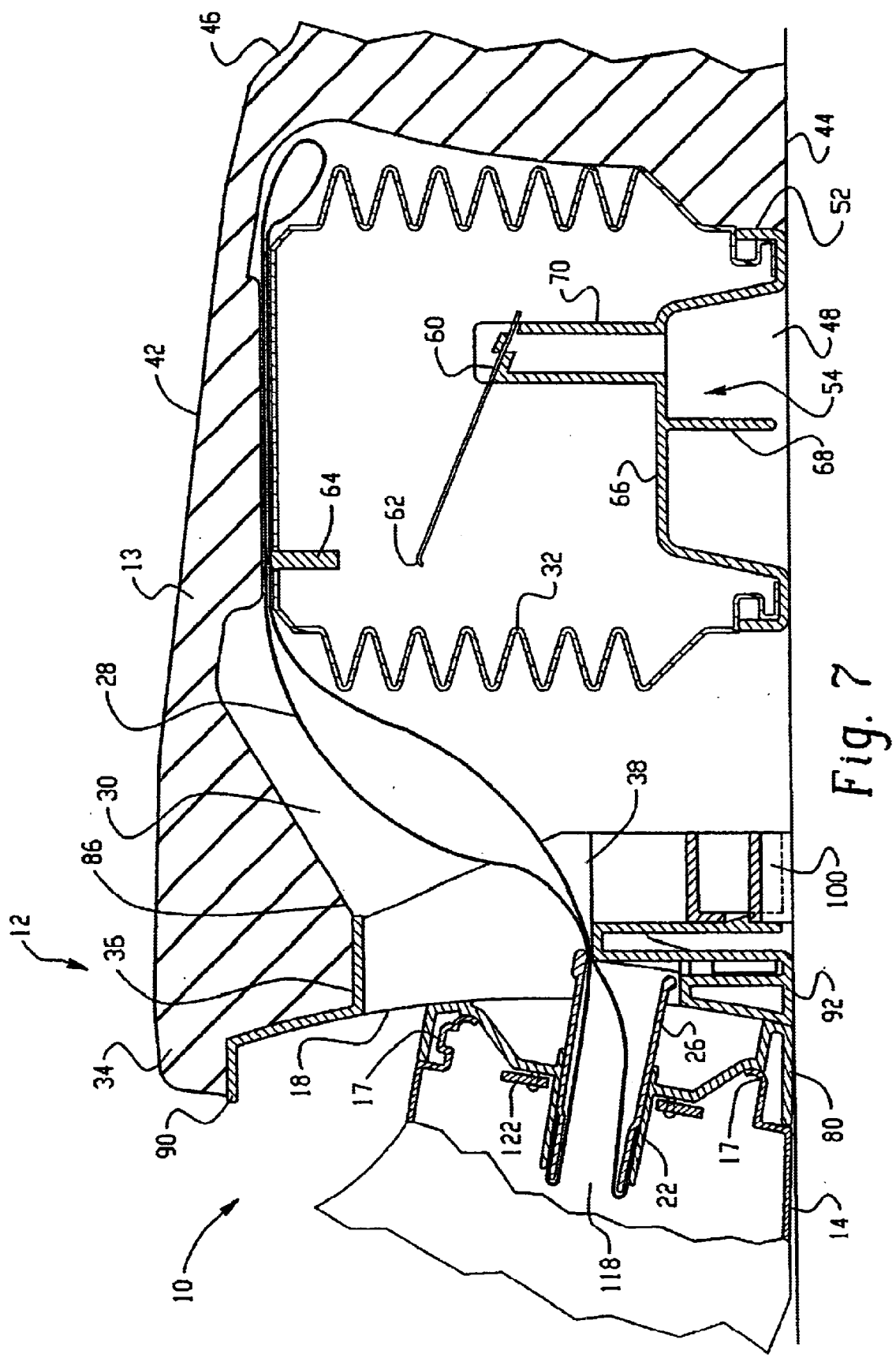
FIG. 7 is a schematic cut-away side view of the interconnected head simulation, neck attachment and torso simulation of FIG. 6, with a bellows selector shown in position for simulation of external heart massage on a child.

Once the lung bag 28, is in place in the air piece 26, the mounting pins 104 are inserted into their respective arcuate channels 102. To secure the mounting pins in the channels, a stop 92 is inserted into the mounting member 94. When the airway passage is in the closed position, as seen in FIGS. 6–7, the upper lip surface 112 rests against the stop 92. Thus, the mounting member 94 may slide upwardly from the stop 92 to the arcuate channels 102. The mounting member 80 also has fixation tabs 120. These tabs 120 engage tabs 17 on the head simulation 16 to attach the mounting member to the head simulation.

Figure 4:
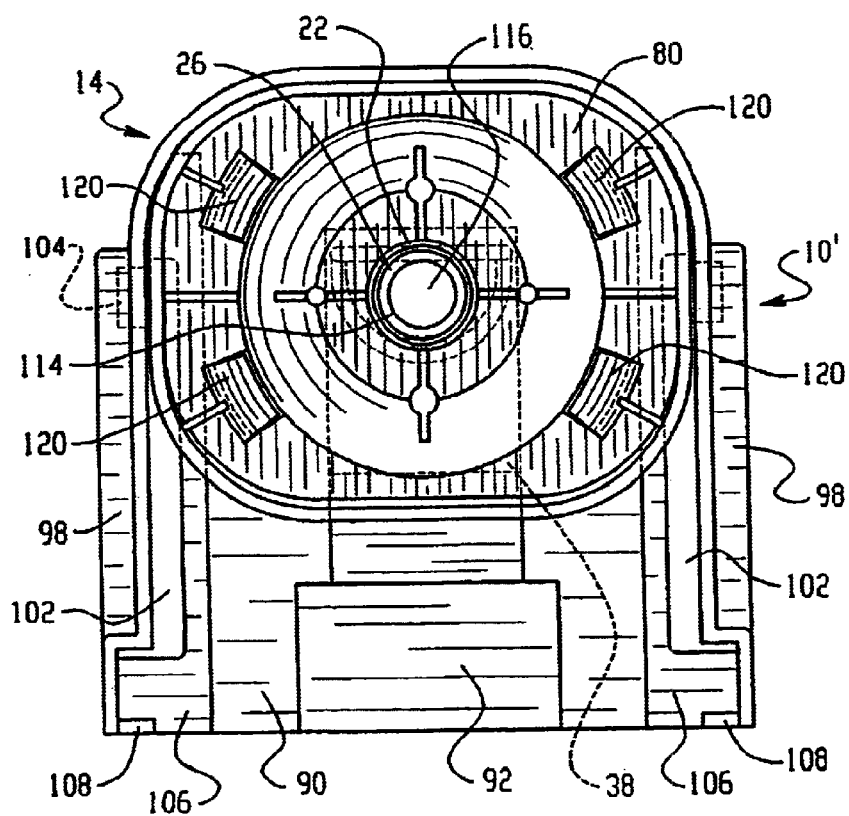
FIG. 4 illustrates the head side view of the neck attachment of FIG. 3.

FIGS. 3–5 demonstrate the effect of tilting the manikin head simulation in order to open the airway passage or the respiratory tract, while FIGS. 1, 2, 6 and 7 illustrate the closed position. As seen in the FIG. 6 closed position, a flat portion of the manikin head is resting on a surface S. When placed on a surface S, the head simulation and neck attachment move under the weight of the head simulation, together with a metal weight or washer 122, 122', and gravity to the closed position of FIG. 6, where the air piece 26 is forced in a downward direction with the upper lip surface 112 of the air piece resting upon the removable stop 92. The mounting plate has a pivot or focal point P located as illustrated in a central portion of the head simulation, so that when the head simulation and torso simulation are both attached to the neck attachment, the head simulation and neck attachment pivot about the focal point when the mounting plate is moved with respect to the mounting member.

Figure 2:
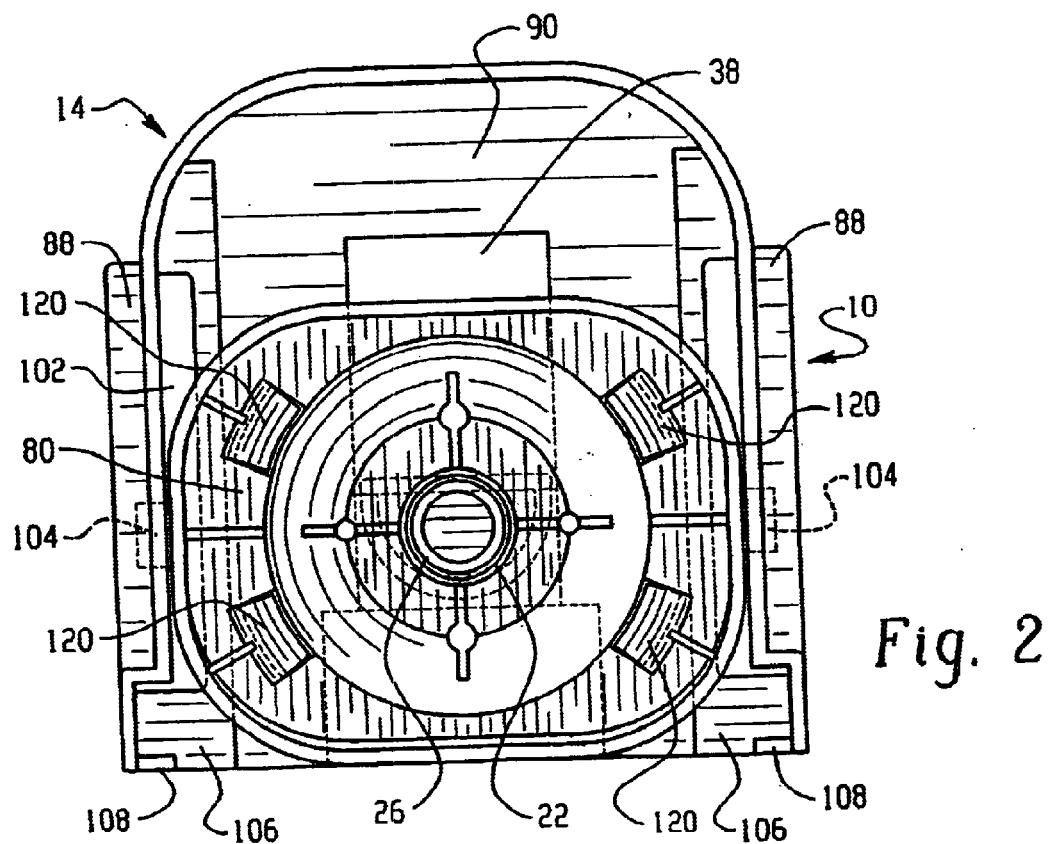
FIG. 2 illustrates a head side view of the neck attachment of FIG. 1.

As seen in FIGS. 3, 4, 5 and 8, when the CPR trainee tilts the manikin head simulation, the mounting member slides in an upward direction through the arcuate channels, thus aligning the air piece central opening 116 with the head simulation and thus opening the lung bag 28. With the air passageway and lung bag now in an open position, the CPR trainee can begin proper ventilation which, if done properly, will result in the visual feedback as mentioned above, and shown in FIG. 9. When the head simulation is not tilted into the proper open position enabling ventilation, the upper lip surface of the air piece rests on the removable stop 92, as shown in FIGS. 1, 2 and 6. In this closed position, air flow along the airway passage 24 from the manikin mouth opening 20 through the neck attachment 14 to the lung bag 28 is restricted, and proper ventilation is not possible.

FIGS. 15–23 illustrate the infant embodiment of the improved CPR manikin of the present invention. Like the adult/child manikin, the infant manikin is designed for proper instruction of the ventilation and external heart massage techniques required for resuscitation of an infant. The infant embodiment may also be used to teach other rescue techniques. Also, as in the adult/child manikin, the infant manikin provides feedback to the CPR trainee to indicate if CPR is being properly performed.

Figure 19:
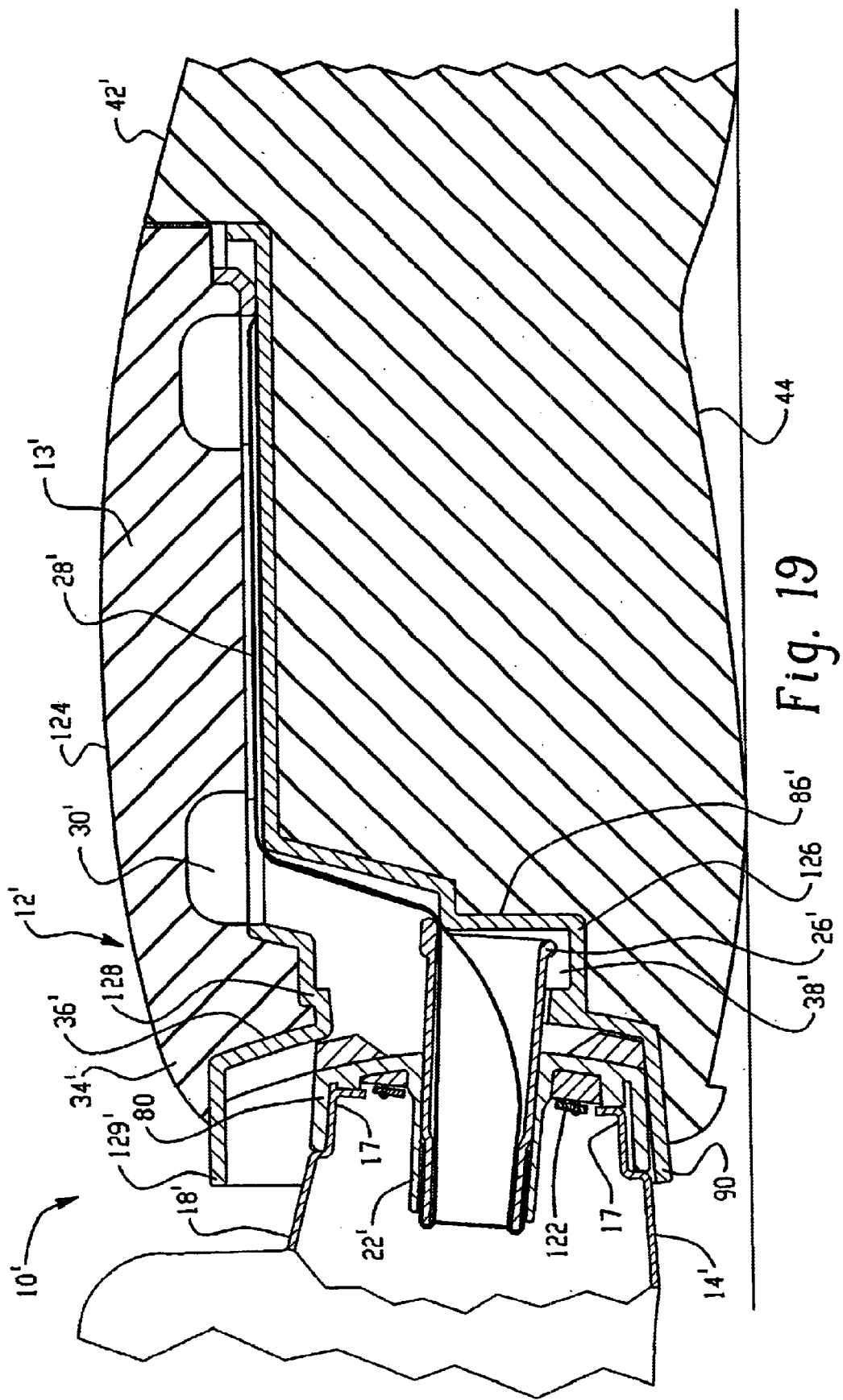
FIG. 19 is a schematic cut-away side view of the infant manikin of FIG. 17 with the torso simulation.

The differences between the adult/child CPR manikin and the infant CPR manikin will now be discussed. The torso simulation 12' contains a torso cavity 30' that is accessed through a foam torso flap 124. A mounting plate/lung bag retainer 126 is disposed within the torso cavity 30'. The retainer 126 is secured within the torso cavity via adhesive. As seen in FIGS. 19–21, the mounting plate/lung bag retainer 126 is engaged with a rigid, removable, hinged lung bag bracket member 128 for securing the lung bag in place. The lung bag bracket member 128 is secured to the foam torso flap 124 via adhesive, such that they may be installed or removed as a unit when the bracket is engaged or disengaged at its non-hinged end 129 from the mounting plate/lung bag retainer as illustrated. When the bracket is removed, the lung bag 28' is placed on top of the mounting plate/lung bag retainer and the lung bag bracket member 128 is then pushed down for re-engagement while holding the lung bag and mounting member in place.

The mounting member 80', secured to the head simulation 16', operates substantially as in the adult manikin to receive a lung bag 28' and opposing mounting pins 104'. The mounting pins 104' are inserted into the mounting member. The lung bag bracket 128 is then engaged in place to define the arcuate channels 102'. When the lung bag bracket 128 is placed in position, a wall is formed for each respective channel so that the pins slide within their respective channels while being contained therein. Also, the lower portion of the mounting plate/lung bag retainer has a stop 92.

The air piece 26', as with the adult/child manikin has a lung bag engaging surface 114', an upper lip 112', and a central opening 116' therethrough. Once the pins 104' are contained within the arcuate channels 102', the mounting member 80' is slidable, with its downward range of motion limited by the upper lip of the air piece engaging and resting on the stop 92'. The upper range of motion is limited by the termination of arcuate channels at the lung bag bracket 128. The mounting member 80' is attachable to the head simulation using tabs as in the adult/child manikin. It is also contemplated that the neck attachment may also be connected to the head simulation by conventional means such screws, pins or adhesive.

Once the lung bag 28' is situated within the torso cavity 30' and the torso flap 124 and bracket 128 have been replaced, the infant manikin is ready for use. As with the adult manikin, the trainee blows air into the head simulation to produce ventilation. If ventilation is performed properly, the chest of the infant manikin will rise, thus providing visual feedback to the trainees, as shown in FIG. 21.

Lung Bag/Protector

Figure 27:
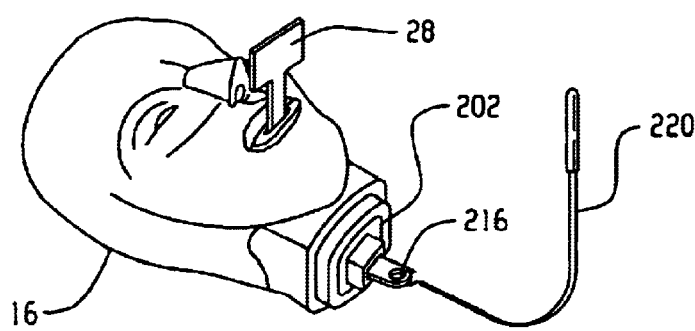
FIG. 27 is a plan view of the head simulation and lung bag insertion tool during installation of a new bag.

As shown in FIGS. 5B and 17B, in an embodiment of the invention the lung bag extends from the exterior of the mouth opening 20, 20' to the torso cavity 30, 30', the lung bag passes through the air piece 26, 26' within the neck attachment. In an embodiment of the invention shown in FIG. 27, the air piece is formed in combination with the neck attachment and is instead referred to as the neck opening 202. In this embodiment a bag installation tool 200 is used to easily position a new lung bag 28, 28' within the head simulation 16, 16'. The lung bag 28, 28' is shown in greater detail in FIG. 24.

Figure 24:
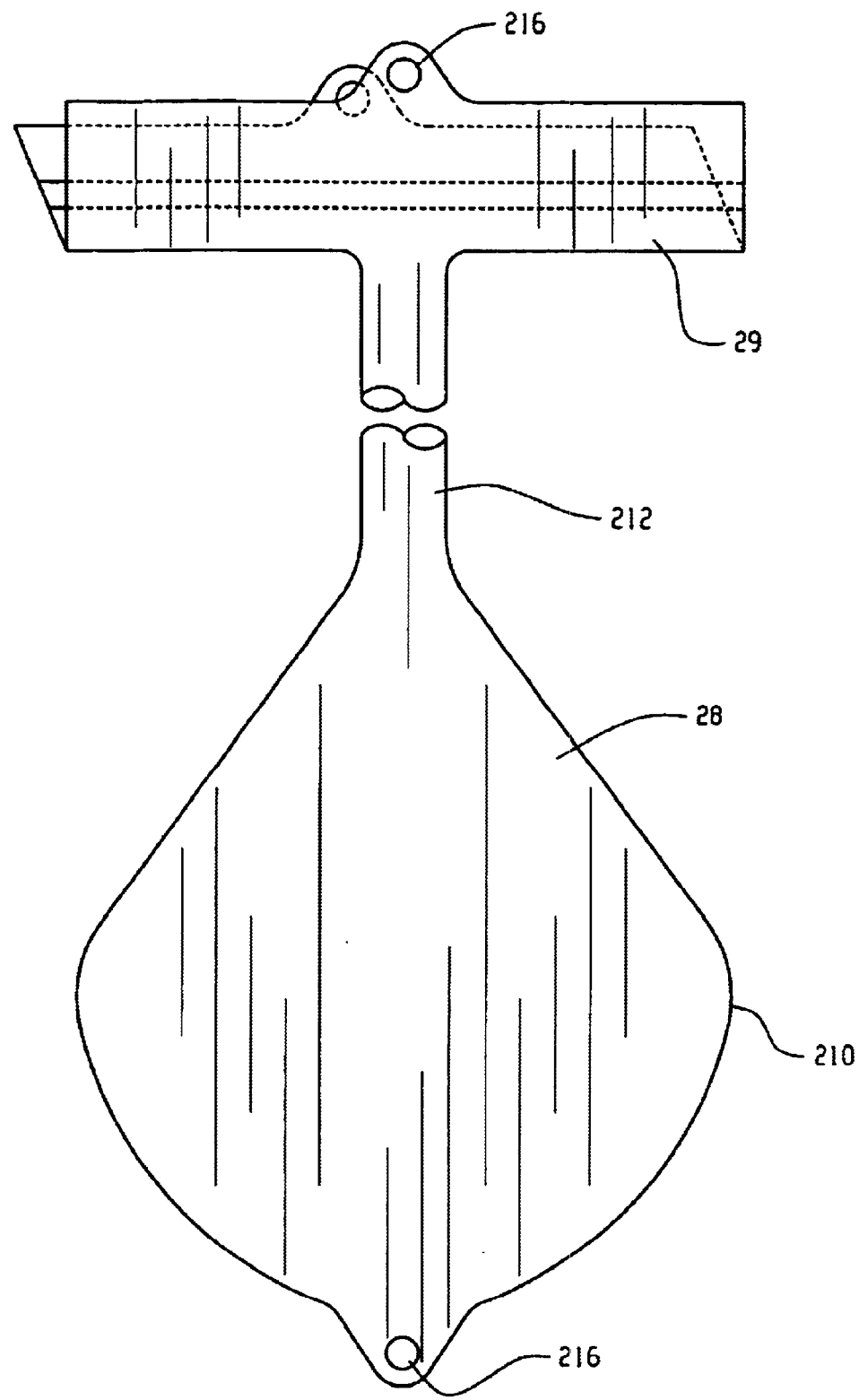
FIG. 24 is an alternate embodiment of the lung bag.
Figure 25:
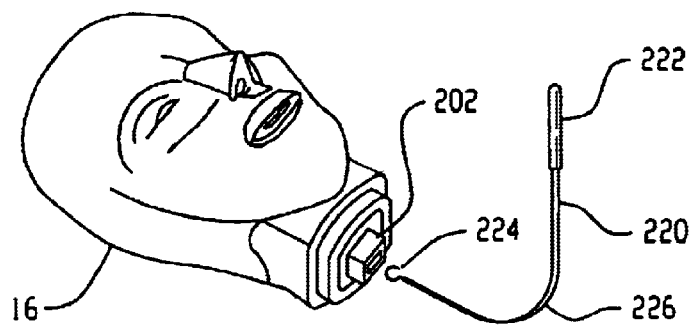
FIG. 25 is a plan view of the head simulation and the lung bag insertion tool.
Figure 26:
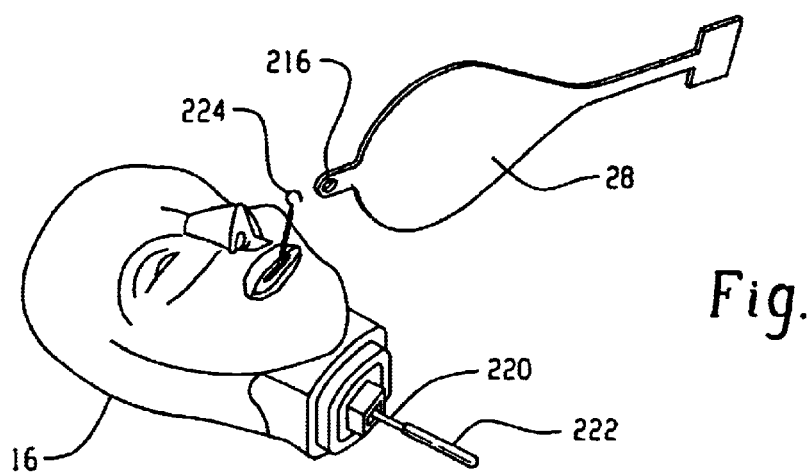
FIG. 26 is a plan view of the head simulation and lung bag insertion tool during installation of a new bag.
Figure 28:
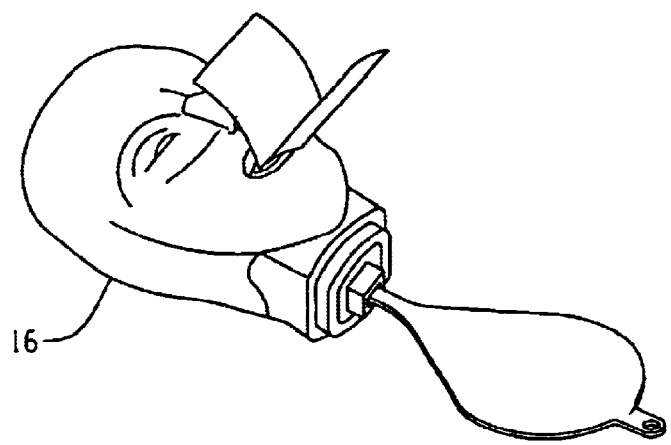
FIG. 28 is a plan view of the head simulation after installation of a new bag.

Referring to FIGS. 24 and 28, the lung bag 28, 28' [JEL, should we continue to use the double numbering?] has a pouch section 210, a neck section 212 and an open end section 29, 29'. The lung bag 28, 28' may be made from materials such as plastic, paper, or rubber. The pouch section 210 is an expandable chamber which is inflated when a user exhales into the mouth opening 20 of the manikin. The pouch section 210 may be bulbous in shape or may be rectangularly or circularly shaped. The pouch section 210 is integrally formed with and adjacent to the neck section 212 of the lung bag 28, 28'. The pouch section 210, when folded, may be passed through the mouth opening 20, 20', airway passage 24, 24' and the neck opening 202 of the manikin. An attachment device 216 extends from the end of the pouch section 210 opposite the side attached to the neck section 212. The attachment device 216 may be an extended nipple that includes a hole, clip, pin or other feature which allows connection to the bag insertion tool 200. The attachment device 216 may be integrally formed with the lung bag 28, 28' or may be a separate attachable piece.

The neck section 212 of the lung bag 28, 28' is an elongate narrow chamber. The neck section 212 is integrally formed and made from the same material as the pouch section 210 of the lung bag 28, 28'. The neck section 212 functions as an air passage between the pouch section 210 where most of the exhaled air is held and the open end section 214 which extends from the mouth opening of the manikin. When the lung bag 28, 28' is installed most or all of the neck portion 212 is concealed within the head simulation 16.

The open end section 214 of the lung bag 28, 28' comprises two separable pieces or tabs. The tabs allow a user of the manikin to place their mouth against the head simulation 16 without actually touching the head simulation 16 itself. The tabs act as a sanitary barrier between the user's mouth and the head simulation 16. As a result the head simulation 16 does not require disinfecting treatment after each use. When the lung bag 28, 28' is installed, the open end section 214 extends from the mouth opening 20, 20' of the manikin. The tabs may be separated and attached to the head simulation 16 to provide a contact surface for the user. When separated, the tabs stay attached to the neck section 212 of the lung bag 28, 28'. An area between the tabs is an opening to the neck section of the lung bag 28, 28'. The tabs may be rectangular shaped or other shapes such a circular, oval shaped or trimmed to fit around the facial features of the head simulation 16. An attachment device (hole, clip, pin) 216 may be a part of or attached to the open end section 214 of the lung bag 28, 28'. This attachment device 216 may be in addition to or in lieu of the attachment device 216 attached to the pouch section 210 and allows for an alternative way of installing of the lung bag 28, 28'.

Referring to FIGS. 25–28, the installation tool 220 is an elongate member having a handle 222 and a bag attachment point 224. The tool 220 may be flexible and is made from flexible materials such as plastic, wire, or other forms of metal. The tool 220 is used to pull or push the lung bag 28, 28' into position within the head simulation 16. The handle 222 of the installation tool 220 is at one end of the tool 220 and may be any shape. In one embodiment of the invention, the width of the handle 222 must be narrow enough to pass through both the mouth opening 20 and the neck opening 202 of the head simulation 16. In another embodiment the handle 222 may have any width. The body 226 of the installation tool 220 is adjacent the handle 222 and may be an elongate flexible section. The body 226, while remaining flexible may be resilient and may be manufactured with a preset curvature. This curvature allows the tool 220, once inserted into the head simulation 16 to easily find a desired exit point. At the end, at both ends, or at any other point along the body 226, is a bag attachment point or points 224. The bag attachment 224 point works in conjunction with a attachment device 216 of the lung bag 28, 28' to form a connection. The bag attachment point 224 may be a hook, pin, clip or any device which works with the attachment device 216. The two connecting devices allow a connection to be made between the lung bag 28, 28' and the insertion tool 220 so the lung bag 28, 28' can be drawn through the head simulation 16.

Bag Installation Method

After the removal of a used lung bag 28, 28' from a manikin, a new lung bag 28, 28' is installed. In a first method of installation, in the first step shown in FIG. 25, the installation tool 220 is placed into the head simulation 16. The end opposite of the handle 222 is inserted into the neck opening and manipulated until the attachment point 224 exits the mouth opening shown in FIG. 26. In a second step, the attachment device 216 of the lung bag 28, 28' is then attached to the attachment point 224 of the insertion tool 220. In a third step shown in FIG. 27, the insertion tool 220 is then retracted through the head simulation 16 until the lung bag 28, 28' is maneuvered into position. In a fourth step, the insertion tool is detached from the lung bag 28, 28'.

In another method of installation (not illustrated) the direction of tool insertion is reversed. The insertion tool 220 is inserted through the mouth opening of the manikin and manipulated until it exits through the neck opening. The attachment point 224 of the insertion tool 220 is attached to an attachment device upon the opening section 29 as opposed to the pouch section 210 of the lung bag 28, 28'. The lung bag 28, 28' is drawn through the head simulation 16 until the opening section 29 exits the mouth opening.

In another method of installation (not illustrated), the lung bag 28, 28' is first attached to the insertion tool 220 at either the attachment device 216 of the pouch section 210 or the opening section 29 and the lung bag 28, 28' is pushed through the manikin either entering the neck section and exiting the mouth opening or vise versa. Once in place, the lung bag 28, 28' is detached and the insertion tool 220 retracted through the head simulation 16.

In another method of installation (not illustrated), the lung bag 28, 28' is first attached to the insertion tool 220 at either the attachment device upon the pouch section or the opening section. The end of the insertion tool 220 to which the lung bag 28, 28' is not attached is then inserted into either the mouth opening or neck opening and manipulated until it exits the alternate opening at the opposite end of the passage. The insertion tool 220 is then extracted through the exit opening while pulling the lung bag 28, 28' into the passage. When part of the lung bag 28, 28' exits the exit opening, the lung bag 28, 28' is detached from the insertion tool 220.

While there have been shown and described what are considered the preferred embodiments of the invention, it will be obvious to one skilled in the art that various changes and modifications may be made therein without departing from the scope of the invention as defined by the claim.

What is claimed is:

1. A system for installing a lung bag into a manikin comprising:
   a manikin having a head simulation including a mouth opening and a neck opening and a passage between said mouth opening and said neck opening;
   an insertion tool having a first and second end, said first end insertable through said mouth opening, said passage, and said neck opening, said insertion tool including a first attachment point for attachment to a lung bag;
   a lung bag including:
      a pouch section;
      a neck section which may be passed through said mouth opening, said passage, and said neck opening;
      an open end section; and
      an attachment device for attachment to said insertion tool.

2. The system of claim 1 wherein said attachment device is a nipple including a hole as part of said pouch section.

3. The system of claim 1 wherein said attachment device is a nipple including a hole as part of said open end section.

4. The system of claim 1 wherein said insertion tool is flexible.

5. The system of claim 1 wherein said insertion tool has a length which is greater than the length of said passage.

6. The system of claim 1 wherein said insertion tool includes a handle.

7. The system of claim 1 wherein said first attachment point is at said first end of said insertion tool.

8. The system of claim 1 wherein said insertion tool is resilient, having a preset curvature and said tool being able to be inserted into said open mouth section, said orifice, and said passage.

9. The system of claim 8 wherein said passage has a passage curvature matching said preset curvature of said insertion tool.

10. A method of installing a lung bag into a manikin comprising the steps of:
    a. inserting an insertion tool into a first opening of a head simulation of said manikin;
    b. moving said insertion tool through said head simulation until said insertion tool protrudes from a second opening of said head simulation;
    c. attaching a lung bag to said insertion tool;
    d. retracting said insertion tool back through said head simulation until a first end of said lung bag protrudes from said first opening of said head simulation and a second end of said lung bag protrudes from said second opening of said head simulation; and
    e. detaching said insertion tool from said lung bag.

11. The method of claim 10 wherein said first opening of said head simulation is a mouth opening and said second opening of said head simulation is a neck opening.

12. The method of claim 10 wherein said first opening of said head simulation is a neck opening and said second opening of said head simulation is a mouth opening.

13. A method of installing a lung bag into a manikin comprising the steps of:
    a. attaching a lung bag to an insertion tool;
    b. inserting said lung bag and insertion tool into a head simulation of said manikin;
    c. pushing said insertion tool through said head simulation until said insertion tool and said lung bag protrude from said head simulation;
    d. detaching said insertion tool from said lung bag; and
    e. retracting said insertion tool back through said head simulation.

14. A method of installing a lung bag into a manikin comprising the steps of:
    a. attaching a lung bag to a first end of an insertion tool;
    b. inserting a second end of said insertion tool into a first opening of a head simulation of said manikin;
    c. passing said insertion tool completely said first opening of said head simulation and a second opening of said head simulation; and
    d. detaching said insertion tool from said lung bag.

* * * * *